US011477123B2

(12) United States Patent
Masputra et al.

(10) Patent No.: US 11,477,123 B2
(45) Date of Patent: Oct. 18, 2022

(54) METHODS AND APPARATUS FOR LOW LATENCY OPERATION IN USER SPACE NETWORKING

(71) Applicant: Apple Inc., Cupertino, CA (US)

(72) Inventors: Cahya Adiansyah Masputra, Cupertino, CA (US); Eric Tsz Leung Cheng, Cupertino, CA (US); Sandeep Nair, Cupertino, CA (US); Wei Shen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/936,228

(22) Filed: Jul. 22, 2020

(65) Prior Publication Data

US 2021/0099391 A1    Apr. 1, 2021

Related U.S. Application Data

(60) Provisional application No. 62/906,617, filed on Sep. 26, 2019.

(51) Int. Cl.
*H04L 47/2425* (2022.01)
*H04L 67/141* (2022.01)
(Continued)

(52) U.S. Cl.
CPC .......... *H04L 47/2433* (2013.01); *H04L 12/28* (2013.01); *H04L 47/24* (2013.01);
(Continued)

(58) Field of Classification Search
CPC . H04L 47/2433; H04L 47/24; H04L 47/2441; H04L 47/2491; H04L 47/805; H04L 12/28; H04L 67/141; H04L 67/322
(Continued)

(56) References Cited

U.S. PATENT DOCUMENTS 5,367,688 A    11/1994  Croll
5,506,968 A *  4/1996  Dukes ................... G06F 13/364
                                              710/240
(Continued)

OTHER PUBLICATIONS

Moon-Sang Lee, Joonwon Lee and S. Maeng, "Context-aware address translation for high performance SMP cluster system," 2008 IEEE International Conferenece on Cluster Computing, Tsukuba, 2008, pp. 292-297; doi: 10.1109/CLUSTR.2008.4663784. (Year: 2008).

*Primary Examiner* — James E Springer
(74) *Attorney, Agent, or Firm* — Sterne, Kessler, Goldstein & Fox P.L.L.C.

(57) ABSTRACT

Methods and apparatus for low latency operation in user space networking architectures. In one embodiment, an apparatus configured to enable low latency data transfer is disclosed. The exemplary embodiment provides a multiplexer that allocates a fixed portion of network bandwidth for low latency traffic. Low latency traffic is routed without the benefit of general-purpose packet processing. In one embodiment, network extensions for low latency operations are described. Specifically, an agent is described that enables low latency applications to negotiate for low latency access. In one embodiment, mechanisms for providing channel event notifications are described. Channel event notifications enable corrective action/packet processing by the low latency application. In one embodiment, mechanisms for providing interface advisory information are described. Interface advisory information may be provided asynchronously to assist in low latency operation.

20 Claims, 15 Drawing Sheets

(51) Int. Cl.
  *H04L 47/2441* (2022.01)
  *H04L 47/2491* (2022.01)
  *H04L 12/28* (2006.01)
  *H04L 47/24* (2022.01)
  *H04L 47/80* (2022.01)
  *H04L 67/61* (2022.01)
  *H04L 12/64* (2006.01)

(52) U.S. Cl.
  CPC ...... *H04L 47/2441* (2013.01); *H04L 47/2491* (2013.01); *H04L 47/805* (2013.01); *H04L 67/141* (2013.01); *H04L 67/61* (2022.05); *H04L 2012/6456* (2013.01); *H04L 2012/6464* (2013.01)

(58) Field of Classification Search
  USPC .......................................................... 370/235
  See application file for complete search history.

(56) References Cited

U.S. PATENT DOCUMENTS

| | | | |
|---|---|---|---|
| 6,032,179 A | 2/2000 | Osborne | |
| 7,100,020 B1 | 8/2006 | Brightman et al. | |
| 7,152,231 B1 | 12/2006 | Galluscio et al. | |
| 7,398,382 B2 | 7/2008 | Rothman et al. | |
| 7,403,542 B1 | 7/2008 | Thompson | |
| 7,506,084 B2 | 3/2009 | Moertl et al. | |
| 7,587,575 B2 | 9/2009 | Moertl et al. | |
| 7,590,817 B2 | 9/2009 | Moertl et al. | |
| 7,617,377 B2 | 11/2009 | Moertl et al. | |
| 7,941,682 B2 | 5/2011 | Adams | |
| 8,214,707 B2 | 7/2012 | Munson et al. | |
| 8,230,248 B2 | 7/2012 | Dance et al. | |
| 8,255,725 B2 | 8/2012 | Shimazaki et al. | |
| 8,352,624 B2 | 1/2013 | Zimmerman et al. | |
| 8,555,099 B2 | 10/2013 | Marinkovic et al. | |
| 8,769,168 B2 | 7/2014 | Moertl et al. | |
| 9,049,179 B2 | 6/2015 | Luna | |
| 9,130,864 B2 * | 9/2015 | Keith | H04L 47/2433 |
| 9,170,957 B2 | 10/2015 | Touzni et al. | |
| 9,280,360 B2 | 3/2016 | Xu et al. | |
| 9,594,718 B2 | 3/2017 | Kaushik et al. | |
| 9,959,124 B1 | 5/2018 | Herbeck et al. | |
| 10,078,361 B2 | 9/2018 | Sanghi et al. | |
| 10,289,555 B1 | 5/2019 | Michaud et al. | |
| 10,331,600 B1 | 6/2019 | Rajadnya et al. | |
| 11,159,651 B2 | 10/2021 | Masputra et al. | |
| 2001/0037410 A1 | 11/2001 | Gardner | |
| 2002/0053011 A1 | 5/2002 | Aiken et al. | |
| 2002/0169938 A1 | 11/2002 | Scott et al. | |
| 2003/0061395 A1 | 3/2003 | Kingsbury et al. | |
| 2004/0010473 A1 | 1/2004 | Hsu et al. | |
| 2004/0010545 A1 | 1/2004 | Panday | |
| 2005/0278498 A1 | 12/2005 | Ahluwalia et al. | |
| 2006/0075119 A1 | 4/2006 | Hussain | |
| 2006/0136570 A1 | 6/2006 | Pandya | |
| 2007/0086480 A1 * | 4/2007 | Elzur | H04L 47/2483 370/463 |
| 2007/0183418 A1 | 8/2007 | Riddoch et al. | |
| 2007/0226375 A1 | 9/2007 | Chu et al. | |
| 2007/0255802 A1 | 11/2007 | Aloni | |
| 2008/0005794 A1 | 1/2008 | Inoue et al. | |
| 2008/0127292 A1 | 5/2008 | Cooper et al. | |
| 2008/0148291 A1 | 6/2008 | Huang et al. | |
| 2009/0240874 A1 | 9/2009 | Pong | |
| 2009/0265723 A1 | 10/2009 | Mochizuki et al. | |
| 2010/0005014 A1 | 1/2010 | Castle et al. | |
| 2010/0017655 A1 | 1/2010 | Gooding et al. | |
| 2010/0049876 A1 | 2/2010 | Pope et al. | |
| 2010/0118041 A1 | 5/2010 | Chen et al. | |
| 2011/0035575 A1 | 2/2011 | Kwon et al. | |
| 2011/0083002 A1 | 4/2011 | Albers et al. | |
| 2011/0161619 A1 | 6/2011 | Kaminski et al. | |
| 2011/0219208 A1 | 9/2011 | Asaad et al. | |
| 2011/0246742 A1 | 10/2011 | Kogen et al. | |
| 2012/0036334 A1 | 2/2012 | Horman et al. | |
| 2012/0260017 A1 | 10/2012 | Mine et al. | |
| 2013/0039278 A1 * | 2/2013 | Bouazizi | H04L 69/22 370/328 |
| 2013/0067188 A1 | 3/2013 | Mehra et al. | |
| 2013/0204927 A1 | 8/2013 | Kruglikov et al. | |
| 2013/0205113 A1 | 8/2013 | Ahmad et al. | |
| 2013/0275976 A1 | 10/2013 | Dawson et al. | |
| 2014/0068624 A1 | 3/2014 | Fuller et al. | |
| 2014/0189057 A1 | 7/2014 | Sankoda et al. | |
| 2014/0355606 A1 | 12/2014 | Riddoch et al. | |
| 2015/0081985 A1 | 3/2015 | Archer et al. | |
| 2015/0261588 A1 | 9/2015 | Liu et al. | |
| 2015/0363110 A1 | 12/2015 | Batra et al. | |
| 2016/0028635 A1 * | 1/2016 | Wang | H04L 47/6215 370/235 |
| 2016/0103480 A1 | 4/2016 | Sanghi et al. | |
| 2016/0231929 A1 | 8/2016 | Tsirkin | |
| 2016/0357443 A1 | 12/2016 | Li et al. | |
| 2017/0003977 A1 | 1/2017 | Sumida et al. | |
| 2017/0003997 A1 | 1/2017 | Kelly et al. | |
| 2017/0075856 A1 | 3/2017 | Suzue et al. | |
| 2017/0111283 A1 | 4/2017 | Kumar et al. | |
| 2017/0147282 A1 | 5/2017 | Seo | |
| 2017/0149890 A1 | 5/2017 | Shamis | |
| 2017/0187621 A1 | 6/2017 | Shalev et al. | |
| 2017/0264497 A1 | 9/2017 | Lim | |
| 2017/0286322 A1 | 10/2017 | Garg et al. | |
| 2017/0337588 A1 | 11/2017 | Chittilappilly et al. | |
| 2017/0371591 A1 | 12/2017 | Xia et al. | |
| 2018/0004690 A1 | 1/2018 | Kaminski et al. | |
| 2018/0070341 A1 * | 3/2018 | Islam | H04L 1/1812 |
| 2018/0173643 A1 | 6/2018 | Yu et al. | |
| 2018/0295052 A1 | 10/2018 | St-Laurent | |
| 2018/0343206 A1 * | 11/2018 | White | H04L 47/11 |
| 2019/0036893 A1 | 1/2019 | Jiang | |
| 2019/0097938 A1 | 3/2019 | Talla et al. | |
| 2019/0213044 A1 | 7/2019 | Cui et al. | |
| 2019/0253351 A1 | 8/2019 | Ihlar et al. | |
| 2019/0303204 A1 | 10/2019 | Masputra et al. | |
| 2019/0303221 A1 | 10/2019 | Masputra et al. | |
| 2019/0303222 A1 | 10/2019 | Masputra et al. | |
| 2019/0303280 A1 | 10/2019 | Masputra et al. | |
| 2019/0303562 A1 | 10/2019 | Masputra et al. | |
| 2019/0303576 A1 | 10/2019 | Masputra et al. | |
| 2019/0306076 A1 | 10/2019 | Masputra et al. | |
| 2019/0306087 A1 | 10/2019 | Masputra et al. | |
| 2019/0306109 A1 | 10/2019 | Masputra et al. | |
| 2019/0306281 A1 | 10/2019 | Masputra et al. | |
| 2019/0306282 A1 * | 10/2019 | Masputra | G06F 16/2228 |
| 2020/0065244 A1 | 2/2020 | Sanghi et al. | |
| 2020/0195684 A1 * | 6/2020 | Linz | H04L 63/1425 |

* cited by examiner

METHODS AND APPARATUS FOR LOW LATENCY OPERATION IN USER SPACE NETWORKING

PRIORITY

This application claims the benefit of priority to U.S. Provisional Patent Application Ser. No. 62/906,617 filed Sep. 26, 2019 and entitled "Methods and Apparatus for Low Latency Operation in User Space Networking", which is incorporated herein by reference in its entirety.

RELATED APPLICATIONS

This application is related to U.S. patent application Ser. No. 16/144,992 filed Sep. 27, 2018 and entitled "Methods and Apparatus for Single Entity Buffer Pool Management", U.S. patent application Ser. No. 16/146,533 filed Sep. 28, 2018 and entitled "Methods and Apparatus for Regulating Networking Traffic in Bursty System Conditions", U.S. patent application Ser. No. 16/146,324 filed Sep. 28, 2018 and entitled "Methods and Apparatus for Preventing Packet Spoofing with User Space Communication Stacks", U.S. patent application Ser. No. 16/146,916 filed Sep. 28, 2018 and entitled "Methods and Apparatus for Channel Defunct Within User Space Stack Architectures", U.S. patent application Ser. No. 16/236,032 filed Dec. 28, 2018 and entitled "Methods and Apparatus for Classification of Flow Metadata with User Space Communication Stacks", U.S. patent application Ser. No. 16/363,495 filed Mar. 25, 2019 and entitled "Methods and Apparatus for Dynamic Packet Pool Configuration in Networking Stack Infrastructures", U.S. patent application Ser. No. 16/368,396 filed on Mar. 26, 2019 and entitled "Methods and Apparatus for Sharing and Arbitration of Host Stack Information with User Space Communication Stacks", U.S. patent application Ser. No. 16/363,495 filed on Mar. 25, 2019 and entitled "Methods and Apparatus for Dynamic Packet Pool Configuration in Networking Stack Infrastructures", U.S. patent application Ser. No. 16/368,338 filed on Mar. 28, 2019 and entitled "Methods and Apparatus for Memory Allocation and Reallocation in Networking Stack Infrastructures", U.S. patent application Ser. No. 16/365,484 filed on Mar. 26, 2019 and entitled "Methods and Apparatus for Virtualized Hardware Optimizations for User Space Networking", U.S. patent application Ser. No. 16/368,368 filed on Mar. 28, 2019 and entitled "Methods and Apparatus for Active Queue Management in User Space Networking", and U.S. patent application Ser. No. 16/368,214 filed on Mar. 28, 2019 and entitled "Methods and Apparatus for Self-Tuning Operation with User Space Stack Architectures", U.S. patent application Ser. No. 16/935,982, filed contemporaneously herewith on Jul. 22, 2020 and entitled "Methods and Apparatus for Emerging Use Case Support in User Space Networking", U.S. patent application Ser. No. 16/936,143 filed contemporaneously herewith on Jul. 22, 2020 and entitled "Methods and Apparatus for Device Driver Operation in Non-Kernel Space", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronic devices, as well as networks thereof. More particularly, the disclosure is directed in one exemplary aspect to methods and apparatus for implementing computerized networking stack infrastructures.

2. Description of Related Technology

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past few years, new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Furthermore, certain types of user applications (e.g., media playback, real-time or interactive network applications) would benefit from low latency data transfers.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions should enable at least some level of low-latency data transfer.

SUMMARY

The present disclosure satisfies the foregoing needs by providing, inter alia, methods and apparatus for multiplexed data transfer within user space networking stack infrastructures. Additionally, methods and apparatus for link advisory within user space networking stack infrastructures are also disclosed.

In one aspect, a user apparatus is disclosed. In one embodiment, the user apparatus includes: a network interface configured to communicate with a network; a processor; and a non-transitory computer readable apparatus comprising a storage medium having one or more computer programs stored thereon. In one exemplary embodiment, the one or more computer programs when executed by the processor, causes the user apparatus to: allocate a first resource for a first traffic class and a second resource for a second traffic class; and transact the first traffic class via the first resource and the second traffic class via the second resource.

In one variant, the user apparatus includes logic configured to perform a copy-checksum operation on only the second traffic class.

In one variant, the user apparatus includes logic configured to perform active queue management (AQM) operation on only the second traffic class.

In one variant, the user apparatus includes logic configured to perform receive mitigation operation on only the second traffic class.

In one variant, the user apparatus includes logic configured to enable zero-copy data transfer on only the first traffic class.

In one variant, the user apparatus includes time division duplex logic configured to transfer data via time slots; and where the first resource comprises a first set of time slots and the second resource comprises a second set of time slots.

In one variant, the first traffic class is associated with a user space low latency application and the second traffic class is associated with non-low latency applications; and the one or more computer programs when executed by the processor, further causes the user space low latency application to request low latency operation from a kernel space application via a low latency agent.

In one aspect, a user apparatus is disclosed. In one embodiment, the user apparatus includes: a network interface configured to communicate with a network; a processor; and a non-transitory computer readable apparatus comprising a storage medium having one or more computer programs stored thereon. In one exemplary embodiment, the one or more computer programs when executed by the processor, causes the user apparatus to: transact general-purpose data packets via a general-purpose processing data path; request special-purpose processing for a user space application; and when granted, transact special-purpose data packets via a special-purpose processing data path.

In one variant, the user space application is a low latency application.

In one variant, the special-purpose processing data path avoids at least one logical function of the general-purpose processing data path.

In one variant, the special-purpose processing data path enables at least one logical function that is not performed by the general-purpose processing data path.

In one variant, the general-purpose processing data path and the special-purpose processing data path share a common set of resources.

In one variant, the general-purpose data packets are generated by a plurality of non-low latency applications.

In one variant, the one or more computer programs when executed by the processor, causes the user apparatus to deny a subsequent request for the special-purpose processing for at least one other low latency user space application. In one such variant, the one or more computer programs when executed by the processor, causes the user apparatus to, when denied, transact data packets for the at least one other low latency user space application via the general-purpose processing data path.

In one aspect, method for providing interface advisory information is disclosed. In one embodiment, the method includes: collecting link activity between a device and an adjacent node, via a kernel space process; generating a session metric for a source node and a destination node, based on the link activity; and providing the session metric to a user space process.

In one variant, the session metric comprises a packet delivery status.

In one variant, the link activity comprises a unit-based channel condition. In one such variant, the session metric comprises a unit-less channel advisory. In one such variant, the method further includes providing a validity check for the unit-less channel advisory.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a non-transitory computer readable storage apparatus implementing one or more of the foregoing aspects is disclosed and described. In one embodiment, the computer readable apparatus includes a program memory, or an EEPROM. In another embodiment, the apparatus includes a solid-state drive (SSD) or other mass storage device. In another embodiment, the apparatus includes a USB or other "flash drive" or other such portable removable storage device.

Other features and advantages of the present disclosure will immediately be recognized by persons of ordinary skill in the art with reference to the attached drawings and detailed description of exemplary embodiments as given below.

All figures © Copyright 2017-2020 Apple Inc. All rights reserved.

DETAILED DESCRIPTION

Reference is now made to the drawings, wherein like numerals refer to like parts throughout.

Detailed Description of Exemplary Embodiments

Existing Network Socket Technologies—

Figure 1:
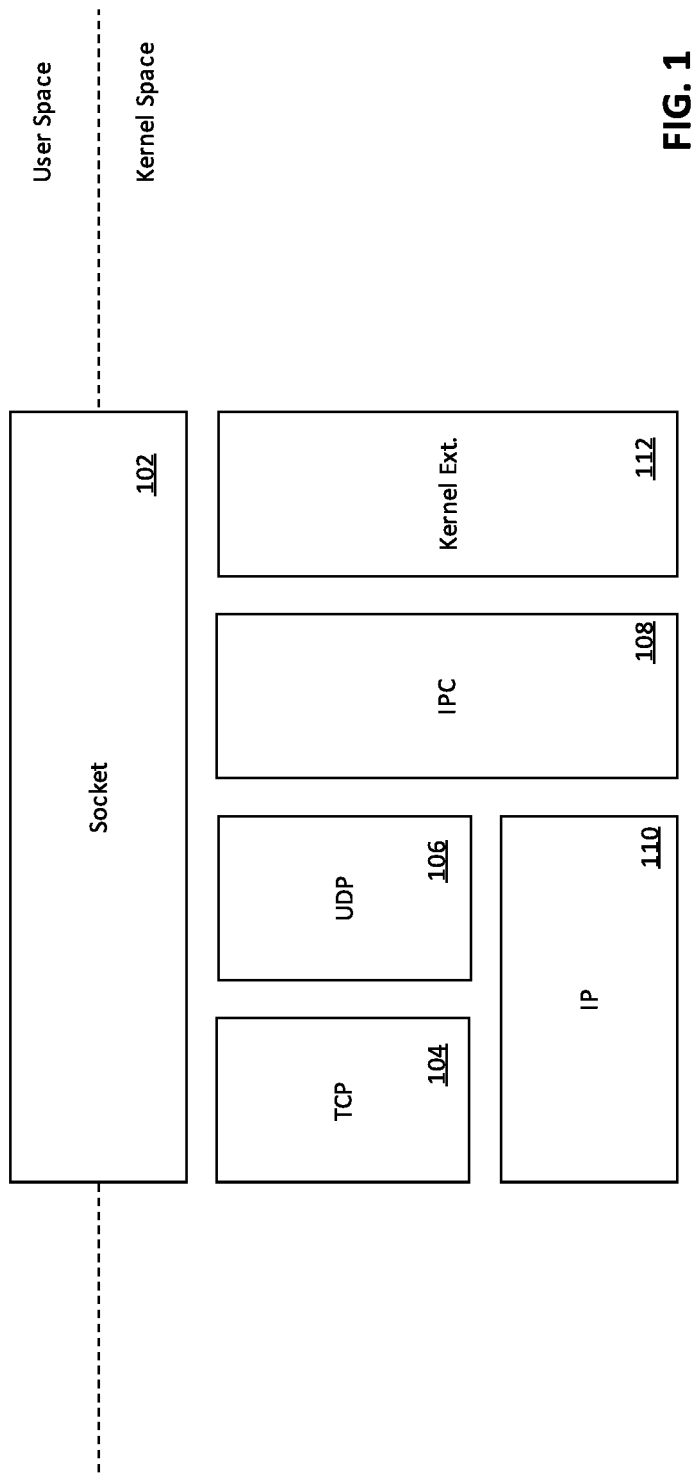
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox") and cannot access the memory of other processes unless explicitly allowed. In contrast, the kernel is the core of a computer's operating system; the kernel can exert complete control over all other processes in the system.

The term "operating system" may refer to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally, these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory or other allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A $3^{rd}$ party kernel extension can introduce instability issues because the 3rd party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Existing Performance Optimization Technologies—

Figure 2:
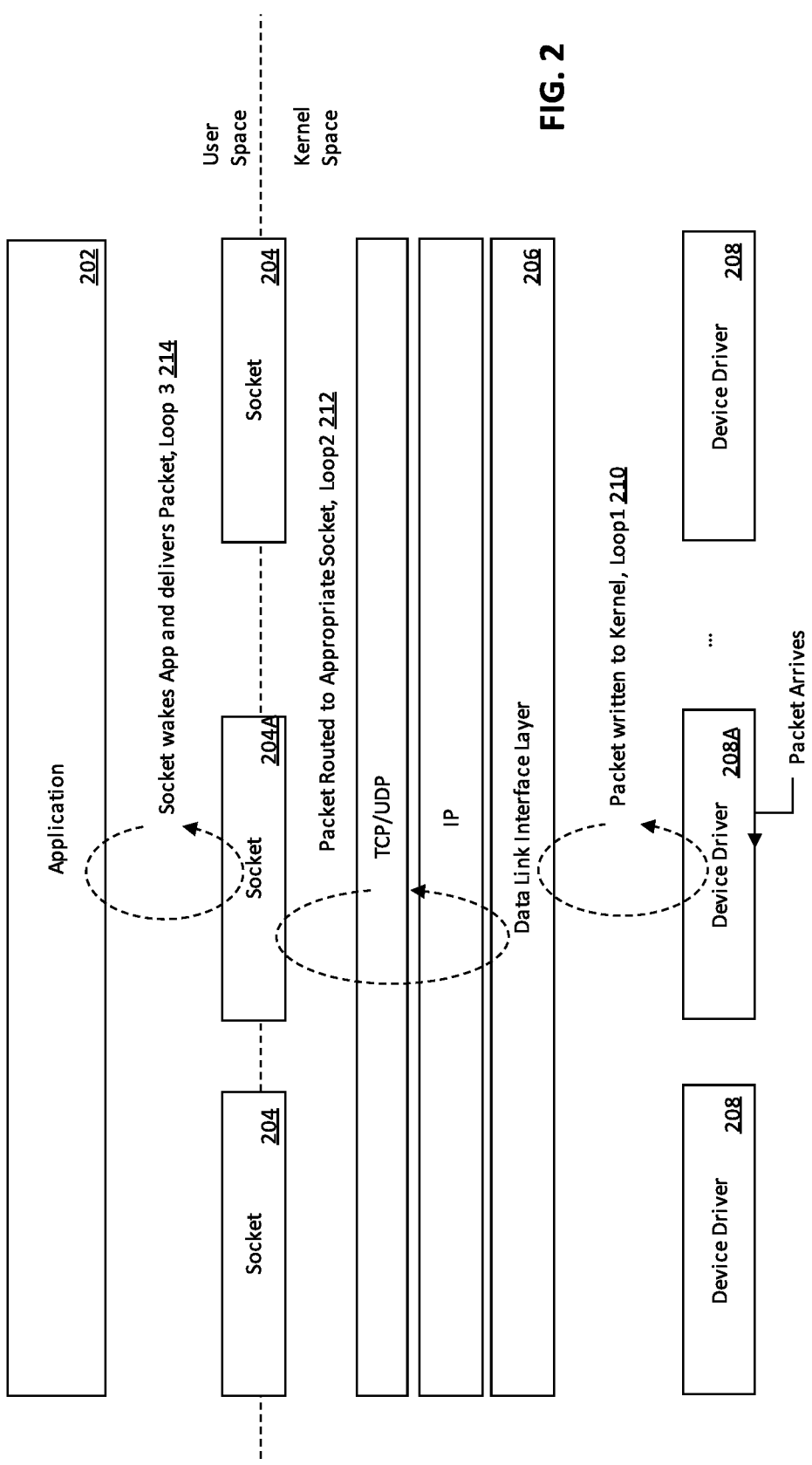
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases

Figure 3:
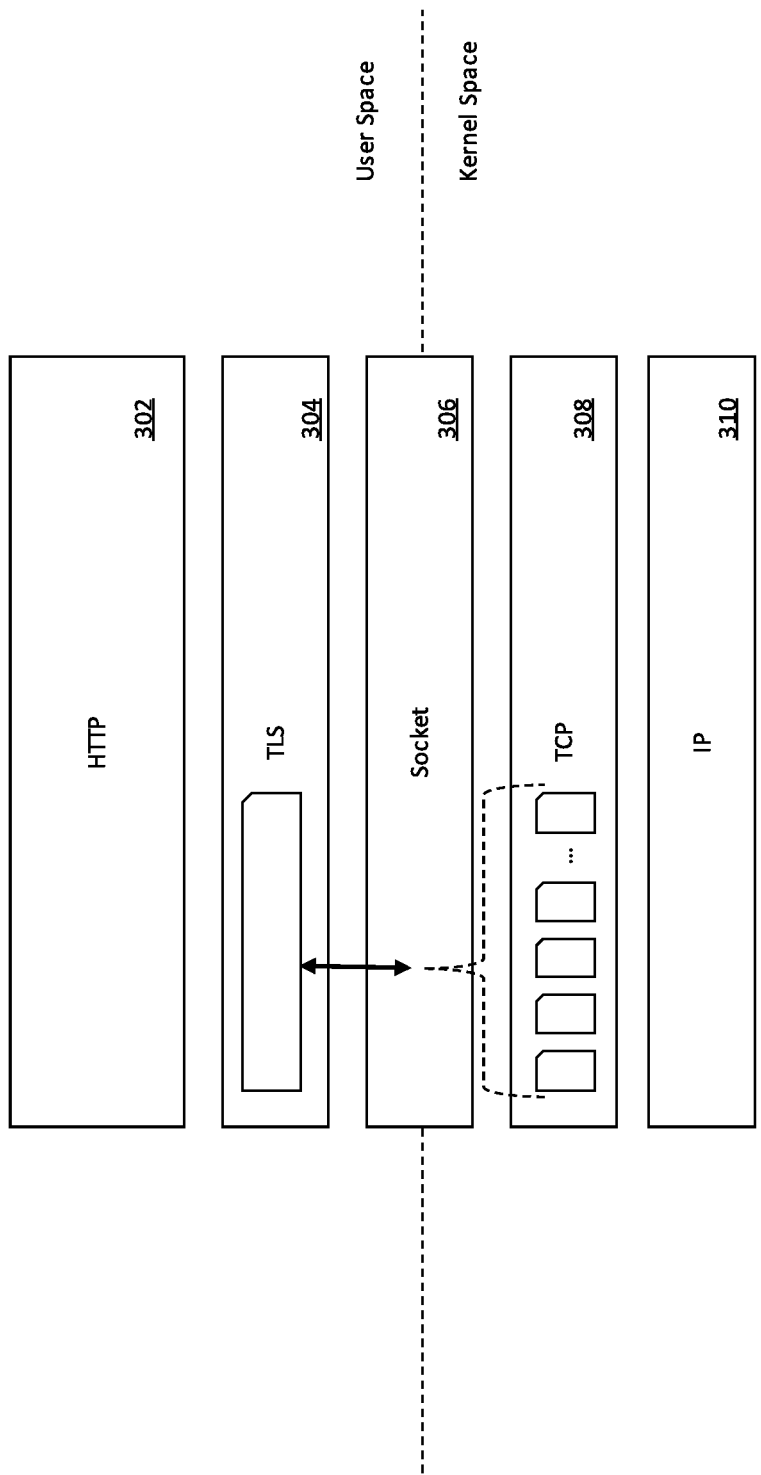
FIG. 3 is a block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
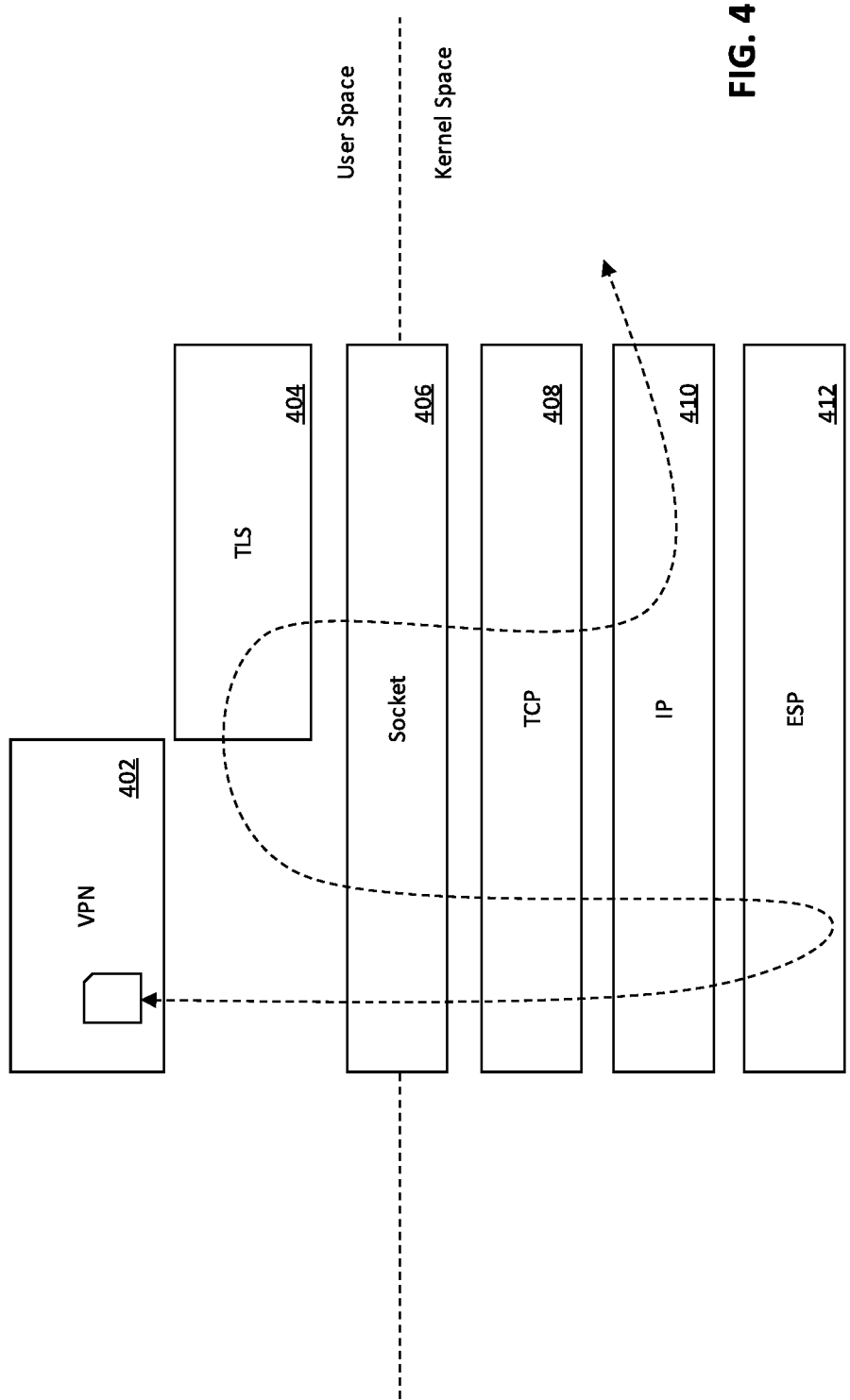
FIG. 4 is a block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
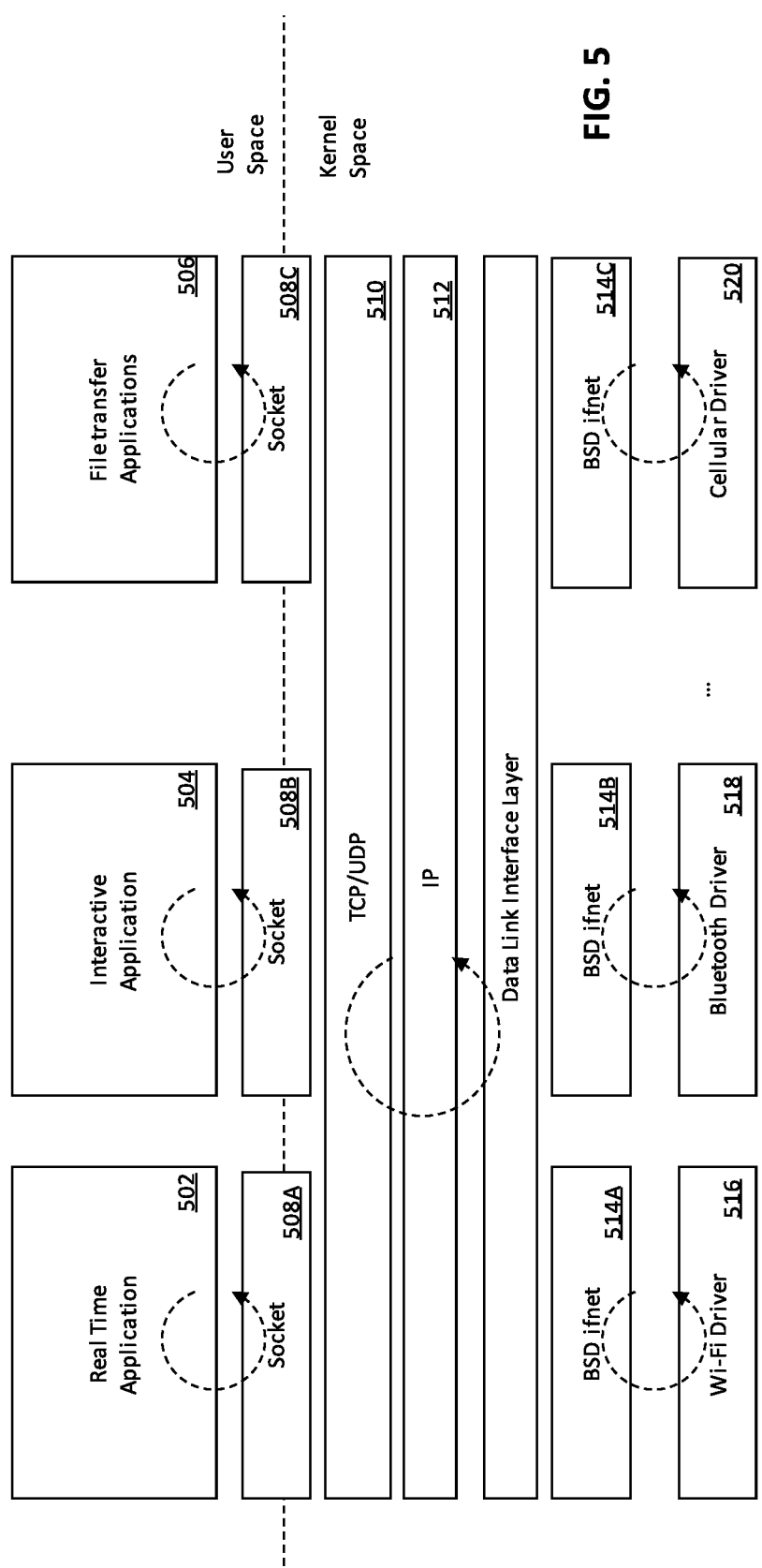
FIG. 5 is a block diagram of an exemplary implementation of application-based tuning, useful to explain various other workload optimization complexities of emerging use cases.

FIG. 5 illustrates a logical block diagram of an exemplary implementation of application-based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention-based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mice). Cellular network technologies 520 often provide non-contention-based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary User Space Networking Architecture—

A networking stack architecture and technology that caters to the needs of non-kernel-based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

The user space networking stack architecture provides an efficient infrastructure to transfer data across domains (user space, non-kernel, and kernel). Unlike the traditional networking paradigm that hides the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket-based communication. Additionally, direct transfer can improve observability and accountability with traffic monitoring.

Figure 6:
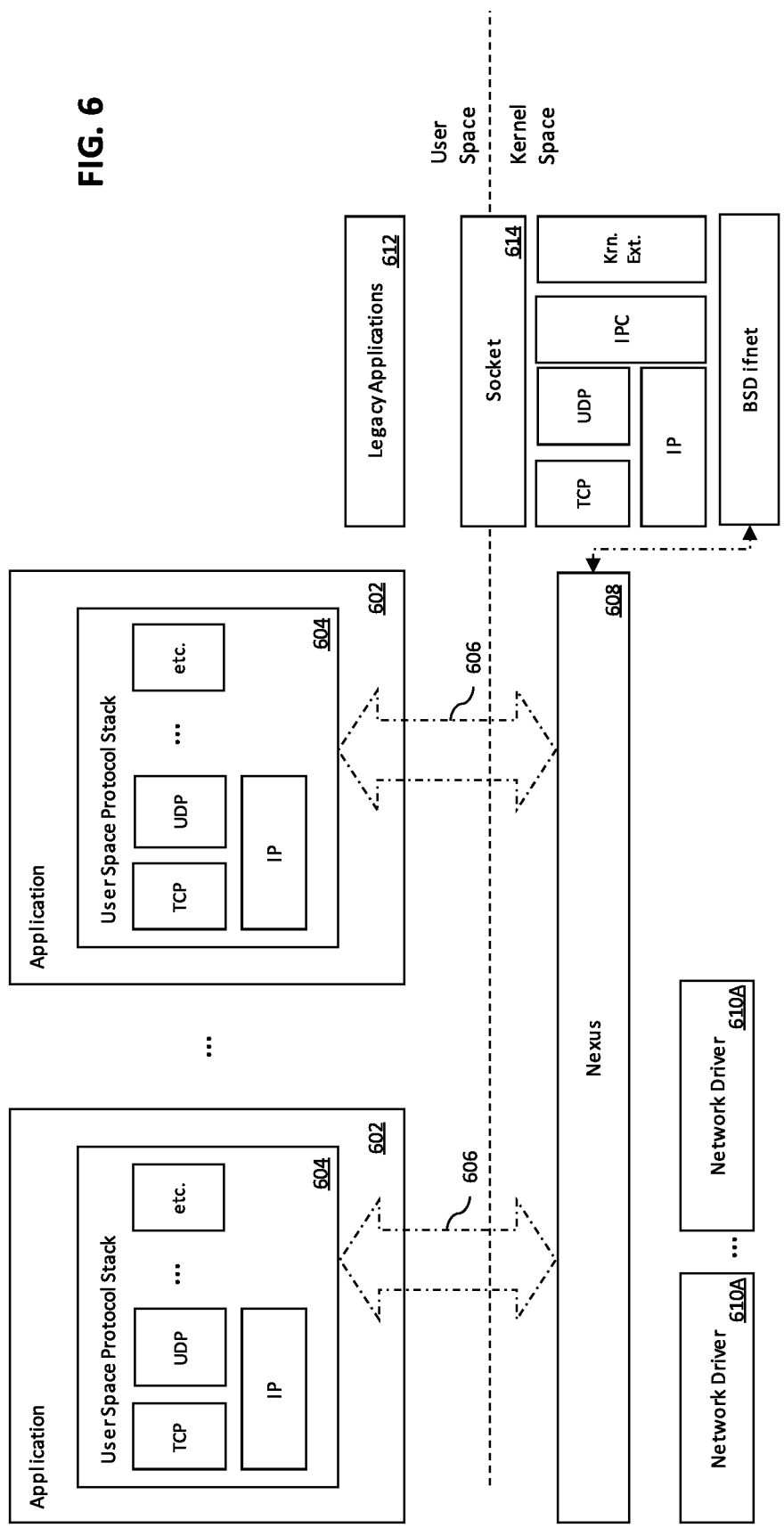
FIG. 6 illustrates one logical representation of an exemplary user space networking stack architecture, in accordance with the various aspects of the present disclosure.

FIG. 6 illustrates one logical representation of an exemplary user space networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally, shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary User Space I/O Infrastructure

In one embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor-based object, rather than as data. In order to access the data, the process de-references the file descriptor for direct access to the shared memory within kernel space. In one such implementation, the file descriptor-based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security-based information (e.g., cyclic redundancy checks (CRC), parity, etc.).

In one embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

In one embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology-based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus—

In one embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one embodiment, the nexus 608 may additionally ensure that there is fairness and/or appropriately prioritize each of its connected stacks. For example, within the context of FIG. 6, the nexus 608 balances the network priorities of both the existing user space application networking stacks 604, as well as providing fair access for legacy socket-based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket-based access. For example, user application networking space may be more heavily weighted to improve overall performance or functionality, whereas legacy socket-based access may be preferred where legacy applications are preferentially supported.

Exemplary Network Extensions

In one embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

Exemplary User Space Networking Stack

Figure 7:
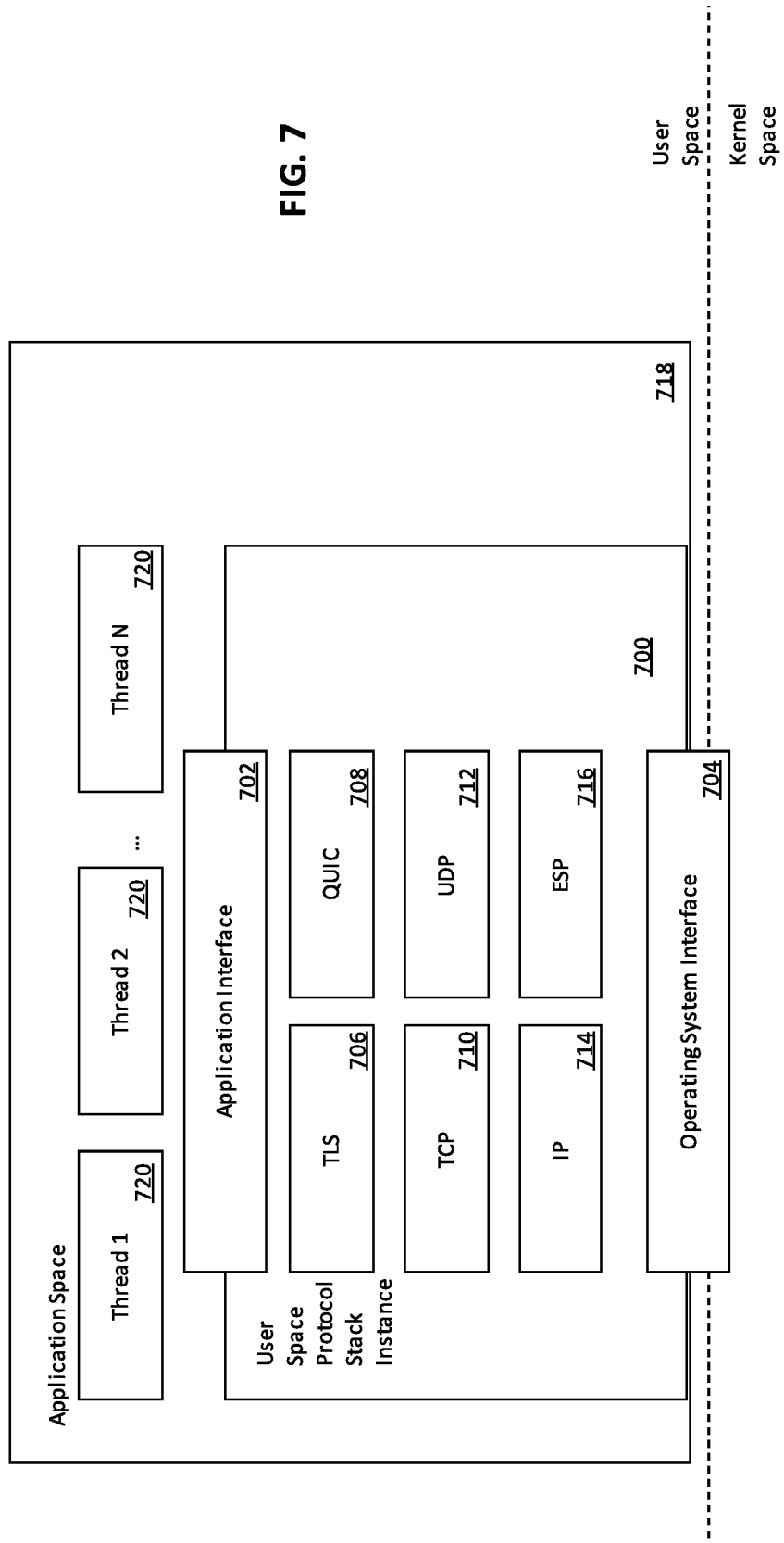
FIG. 7 is a block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Low Latency Enhancements—

Figure 8:
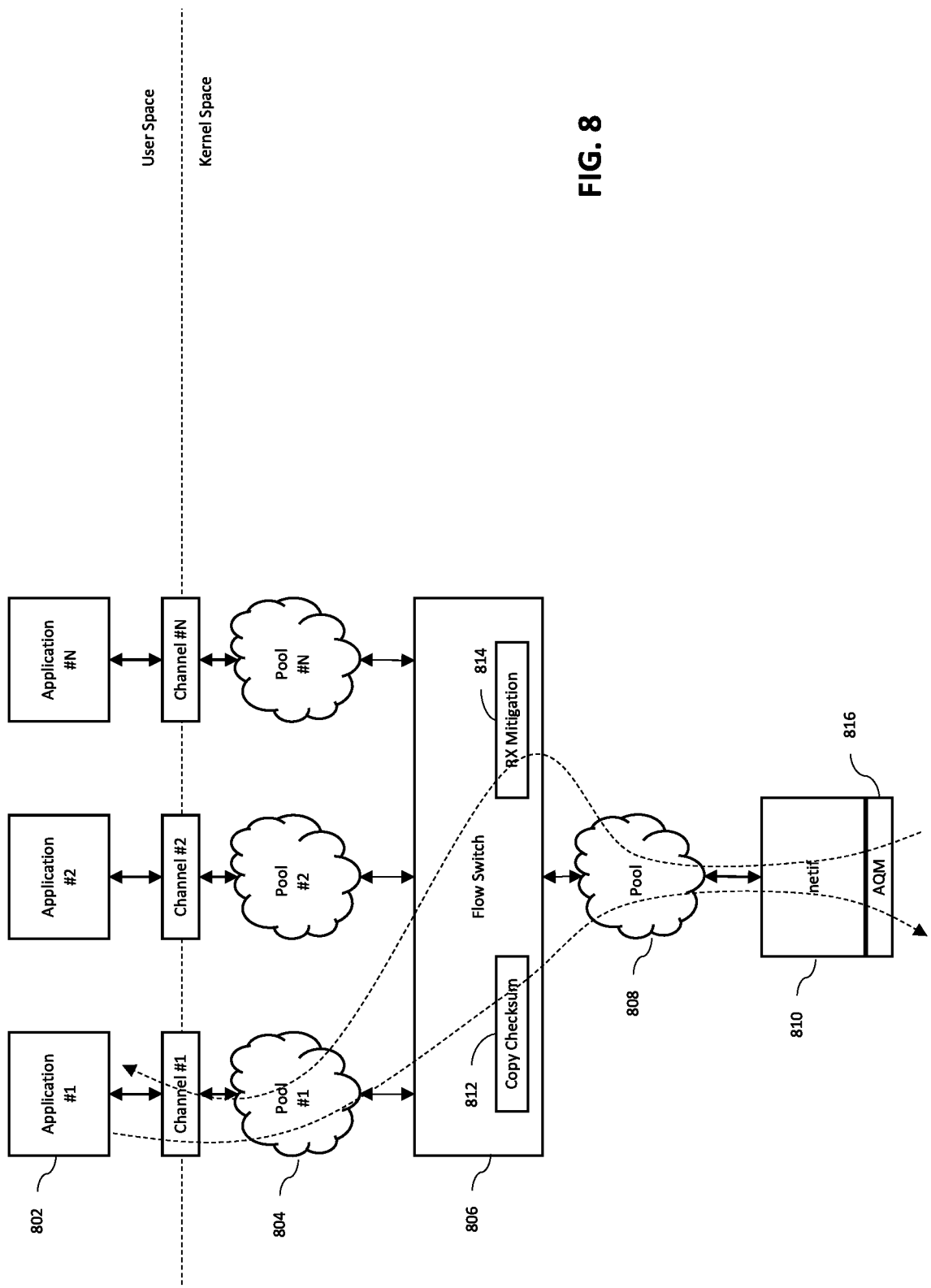
FIG. 8 is a block diagram of packet flow, in accordance with the various aspects of the present disclosure.

FIG. 8 is a logical block diagram of packet flow in accordance with the aforementioned user space networking architecture. In the illustrated packet flow, the user space application 802 writes packets for transfer into a user packet pool 804. After context switching to kernel space, the flow switch 806 performs copy-checksum to move the user space packets into the driver pool 808 and the driver (netif) 810 can transact data directly from the driver pool 808. Notably, the aforementioned process greatly reduces context switching between user space and kernel space. In practical operation, user space networking has an inherently lower average latency than socket-based techniques due to the reduced context switching.

The exemplary user space networking architecture still provides some general-purpose networking functionalities under the assumption that commonly performed techniques are more efficiently handled as operational overhead. For example, as shown in FIG. 8, the user space networking architecture provides e.g., copy-checksum logic 812, receive mitigation logic 814, and active queue management (AQM) logic 816.

Copy-checksum logic 812 is described in e.g., U.S. patent application Ser. No. 16/365,484 filed on Mar. 26, 2019 and entitled "Methods and Apparatus for Virtualized Hardware Optimizations for User Space Networking" previously incorporated supra. As described therein, the "copy-checksum" is presented to the user space protocol stack as a virtualized network port that provides e.g. hardware accelerated checksum offloading. While copy-checksum is slightly more computationally expensive than a copy-only;

the combined copy-checksum is much cheaper than existing software-based checksums which perform the copy and checksum separately.

Similarly, receive mitigation logic 814 is described in U.S. patent application Ser. No. 16/146,533 filed Sep. 28, 2018 and entitled "Methods and Apparatus for Regulating Networking Traffic in Bursty System Conditions", previously incorporated supra. Notably, the techniques described therein reduce intermittent bursts of very large amounts of data (e.g., 10 Gb/s) with a reducing ring buffer to smooth out the transfer of bursty data.

Active queue management (AQM) logic 816 is described in U.S. patent application Ser. No. 16/368,368 filed on Mar. 28, 2019 and entitled "Methods and Apparatus for Active Queue Management in User Space Networking", previously incorporated supra. As described therein, the user space networking stack can implement AQM to prevent buffer bloat conditions intelligently based on which flows should be preserved and/or which flows can be culled. More directly, by intelligently selecting AQM culling based on application considerations, the user space networking stack can benefit from both AQM as well as flow priorities.

Nonetheless, certain emerging usage scenarios may push the boundaries of consumer electronics devices. One example of such aggressive usage scenarios, Apple TV® devices (developed by the Assignee hereof) are designed to stream media with little (if any) leftover resources for non-streaming system tasks. Closely matching the devices capabilities to its intended usages reduces overall manufacturing bill-of-material (BOM) costs and these benefits can be passed on to the consumer and/or manufacturer profitability. In other words, while it may be possible to manufacture such devices with more processing, memory, and/or bandwidth, doing so may be commercially undesirable.

Within this context, the aforementioned user space networking techniques provide improvements over prior art socket-based networking techniques, however further reductions may be necessary for aggressive use cases. Specialized devices may not require certain general-purpose networking functionalities. For example, AQM logic 816 may not be helpful where the streaming video device is the primary bandwidth consumer in a network (where there is no significant danger of unmanaged buffer bloat). Similarly, receive mitigation logic 814 and/or copy-checksum logic 812 may be unnecessary, if the user space application is aware of (and/or designed to maximize) specific hardware.

In fact, general-purpose networking functionalities may actually detract from performance. For instance, video streaming may be highly sensitive to latency; failing to meet raw latency requirements may result in perceptible video lag that impacts user experience. Moreover, certain application may be sensitive to latency jitter; the term "latency jitter" refers to the variance in latency due to user space/kernel space loads and priority. Since user space applications are only guaranteed "best effort", they may be deprioritized relative to kernel space activity; in practice, the aforementioned user space networking stacks may experience much higher latency jitter than kernel space alternatives. In certain applications, unpredictable latency jitter may be problematic even where a raw latency requirement is met.

To these ends, various aspects of the present disclosure seek to reduce latency and minimize latency jitter. Specifically, various embodiments of the present disclosure enable direct access and reduced context switching for low latency operation, and/or faster reporting of the network interface conditions.

Low Latency Port Operation—

Figure 9:
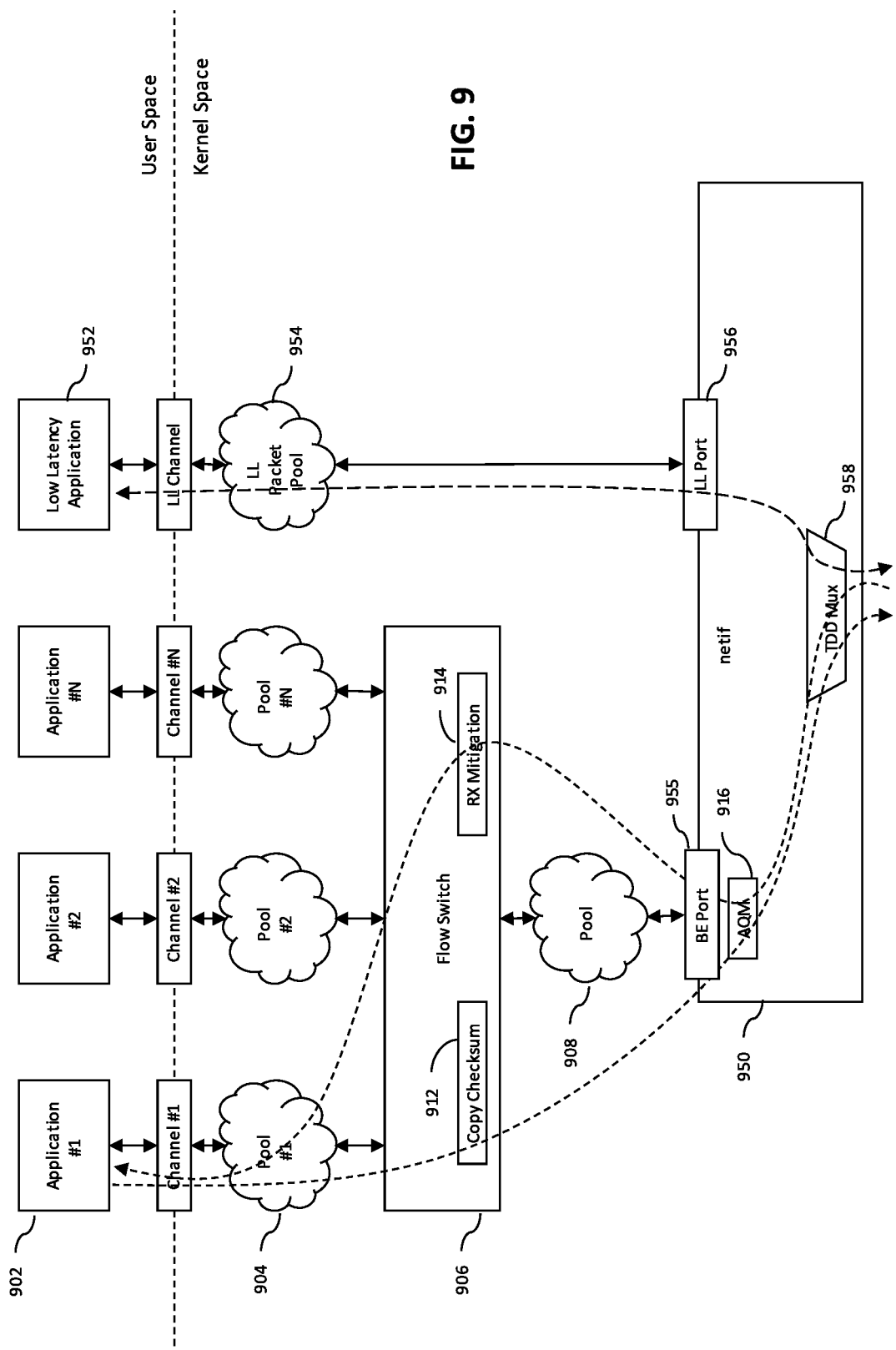
FIG. 9 is a logical block diagram of packet flow in one exemplary low latency networking architecture, in accordance with various principles described herein.

FIG. 9 is a logical block diagram of packet flow in one exemplary low latency networking architecture, in accordance with various principles described herein. In one embodiment, the low latency networking architecture augments the aforementioned user space networking architecture providing a "best effort" path and a "low latency" path. Specifically, as shown therein, the low latency networking architecture implements a network interface (netif) 950 that supports a best effort port 955 and a low latency port 956.

In one embodiment, the best effort port 955 and low latency port 956 are allocated bandwidth via a multiplexer 958. In one exemplary embodiment, the multiplexer 958 is a time division duplex (TDD) multiplexer that allocates time slots for uplink and downlink directions for best effort and low latency traffic. For example, the TDD multiplexer 958 may allocate e.g., 60% of the uplink and downlink time slots for low latency traffic, and the remaining 40% of the time slots for best effort traffic.

In one such variant, the bandwidth allocations for low latency traffic and best effort traffic may be configured by the kernel based on user space considerations. The resource allocations may have a variety of different configurable parameters e.g., number of frames, size of frames, required latency, maximum latency jitter, etc. For example, a $1^{st}$ party application may be allocated low latency time slots based on specific and/or well understood use case scenarios (e.g., video streaming applications). Similarly, $2^{nd}$ or $3^{rd}$ party applications may be allocated low latency time slots subject to e.g., various security and/or resource limitations. For instance, a $3^{rd}$ party application may be allocated resources that are subject to reclamation, etc.

In one exemplary embodiment, low latency traffic is directly routed from the low latency channel to the low latency port (and vice versa). Specifically, a low latency application 952 can write to a low latency packet pool 954 which can be directly accessed by the low latency port 956 (for zero-copy data transfer). So-called "zero-copy" operations refer to operations that can be performed without copying data from one memory area to another; in the illustrated embodiment, the low latency packets can be read from the same pool 954 that they were written into. Zero-copy operations save processor cycles and memory bandwidth when transmitting a file over a network (e.g., there is no copy-checksum latency penalty.)

More generally, the low latency interface 956 provides direct access to the network interface 950. The low latency port obviates most general-purpose packet processing associated with best effort delivery (e.g., copy-checksum, receive mitigation, active queue management, etc.) In other words, low latency operation trades general-purpose functionality for shorter latency. In some cases, general-purpose packet processing may be implemented within the low latency application 952 operating from user space (rather than in the kernel space); for example, higher layer transport stack functionality (e.g., UDP, TCP) or some modified low latency variant thereof may be integrated within the low latency application 952.

While the present disclosure describes a highly streamlined low latency data path, artisans of ordinary skill in the related arts given the contents of the present disclosure, will readily appreciate that other implementations may be substituted with equal success. Less aggressive variants may include some packet processing functionality; for example, zero-copy operations are faster, however some variants may prefer to use a more robust copy-checksum paradigm (e.g., copy-checksum moves from a user packet pool to a driver packet pool).

While the foregoing example is based on time slot resources, other resources may be substituted with equal success. For example, other multiplexing techniques may allocate different frequency resources, different network priorities, processing and/or memory resources, etc. Moreover, while the illustrated multiplexing division is configurable in a semi-static manner by the kernel, other implementations may use static (fixed allocations) and/or dynamic allocations (based on network conditions, application requirements, kernel considerations, etc.). More generally, artisans of ordinary skill given the contents of the present disclosure will readily appreciate that virtually any multiplexing scheme may be substituted with equal success.

The foregoing technique greatly reduces latency and/or latency jitter for certain types of traffic. While kernel space tasks are always given highest priority, prioritizing low latency traffic in this manner ensures that the processor always handles low latency traffic as quickly as possible (ahead of all other user space traffic). In other words, best effort traffic is handled only after low latency traffic and kernel space operations have completed. This prioritization of low latency resource allocations ensures that context switching can reliably occur within the desired/required latency interval.

In one embodiment, data packets that are received from the network may be inspected to determine whether they should be forwarded via the best effort port or the low latency port. In one exemplary embodiment, the multiplexer 958 includes a packet header sniffing logic that identifies low latency traffic based on specific headers (IPv6 headers, etc.); all other traffic may be forwarded to the best effort port. Other implementations may use e.g., IP address or other flow classification techniques. For example, flow classification techniques described in U.S. patent application Ser. No. 16/236,032 filed Dec. 28, 2018 and entitled "Methods and Apparatus for Classification of Flow Metadata with User Space Communication Stacks", previously incorporated supra, may be substituted with equal success by artisans of ordinary skill given the contents of the present disclosure.

As but one such example, the source user space application can indicate specific expiration times on a per-packet basis; expiration times enable the source application to identify packets that can be dropped if the packets can't be delivered within the time-to-live window e.g., to conserve transmit resources. In other words, the packet payload may only be useful during a specific time window ("time-to-live"), expired packets do not need to be delivered. The expiration time can be checked by any entity in the transmit path (e.g. user space application libraries (libnetcore), the network interface (netif), the driver application, etc.)

In some cases, expired packets may be dropped without reporting; in other cases, expired packets trigger a reporting event to either the source or destination application. In one such embodiment, delivery signaling of expired packets to the source application is done via channel event ring mechanisms described infra. Expiration delivery failures may cause the source application to e.g., generate more recent information that can supersede expired packets, adjust latency and/or throughput expectations, etc.

Due to the specialized treatment and nature of low latency access, some implementations may impose heightened security and/or safeguards against unauthorized use of the low latency data path. For example, in some implementations, the specific set of IPv6 headers that are allocated for low latency traffic may not be accessible to non-1$^{st}$ party applications. In some implementations, the IPv6 headers may have randomized and/or secure techniques for generation (thereby preventing spoofing, etc.) Still other variants may include basic protections within the header information (e.g., secure hashes, signing, etc.)

Referring back to FIG. 9, the user space networking architecture remains largely unchanged for best effort traffic. As shown, the user space networking architecture includes the aforementioned e.g., user space applications 902, user packet pool 904, flow switch 906, and driver pool 908. Similarly, general-purpose networking logic for the user space networking architecture remains unchanged (e.g., copy-checksum logic 912, receive mitigation logic 914, and active queue management (AQM) logic 916 operate as previously discussed.) As noted supra, the best effort traffic may be allocated a portion of the total bandwidth by the network interface 950; in some variants, the best effort path and associated logic may be unaware of the reason for bandwidth reduction (e.g., similar to the manner in which network congestion might affect bandwidth availability). In other variants, the user space applications 902 may be apprised of the best effort resource allocation so as to e.g., gracefully handle reductions in performance.

Figure 10:
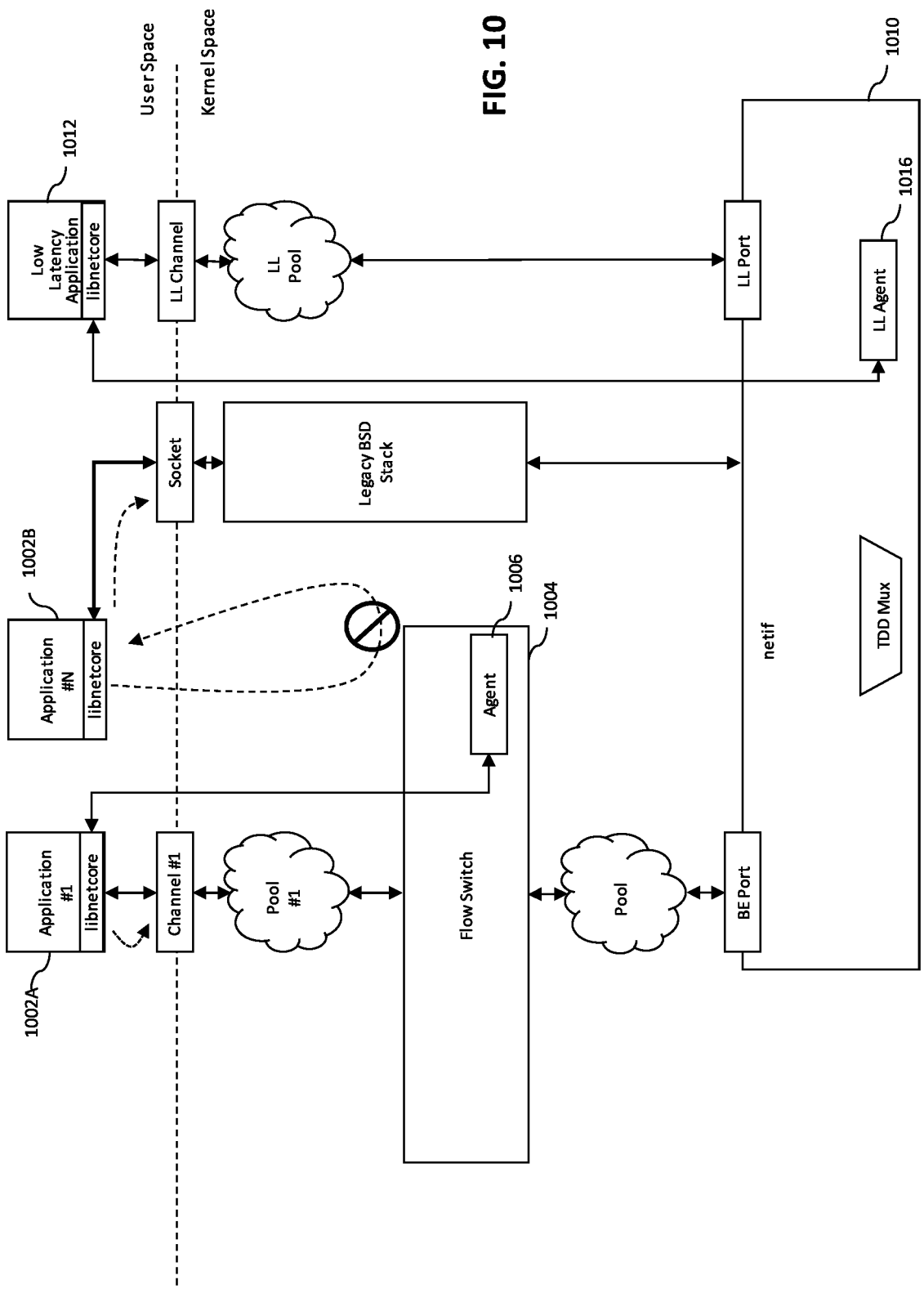
FIG. 10 is a block diagram of networking extension (agent) operation, useful in conjunction with low latency networking architecture.

FIG. 10 is a logical block diagram of networking extension (agent) operation useful in conjunction with low latency networking architecture. As a brief aside, a network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, time-to-live, priority, collaboration, visibility, and/or other sharing of user space and kernel space information. While the agent negotiates with the kernel on behalf of the application, the kernel ultimately decides on scheduling, priority, etc.

Referring back to FIG. 10, the exemplary flow switch discovery is based on networking extensions (agents). As a brief aside, a first user space application 1002A uses a networking agent (libnetcore) to query whether or not the flow switch 1004 is available: if the flow switch's agent 1006 responds, then a channel to the flow switch can be opened. In contrast, if the query fails because no agent is available, then the user application 1002B uses traditional socket-based stacks.

In one exemplary embodiment of the present disclosure, a low latency network extension 1016 is disclosed. Much like the flow switch agent 1006, the low latency agent 1016 enables a low latency application 1012 to negotiate for access to the network interface's 1010 low latency port. However, the low latency agent 1016 provides additional network interface granularity that is specific to low latency operation. Various benefits and efficiencies can be gained through the use of the low latency network extension 1016. In particular, the low latency application 1012 can control low latency operation down to the maximum extent exposed by the driver (e.g., resource allocations, time-to-live, network congestion, latency, etc.) In other words, the low latency agent 1016 exposes specific network information that can be leveraged by the low latency application. For example, a streaming video application can correctly size packets based on e.g., network congestion, error correction, latency, throughput. In this manner, the video application can minimize re-transmissions and/or optimize video streaming.

As previously alluded to, the low latency agent 1016 can trust the kernel, but the kernel may or may not trust the low latency agent 1016. For example, the exemplary low latency agent 1016 can be used by the kernel to convey sensitive information in a trusted manner to the low latency application 1012; e.g., network congestion information, time slot availability, latency, latency jitter, packet expiration, etc. Similarly, the exemplary low latency agent 1016 can be used by the low latency application 1012 to request a low latency treatment. Since the low latency agent 1016 operates on behalf of the low latency application 1012, the agent's privilege is not promoted to kernel level permissions. In other words, the agent does not permit the user application to exceed its privileges (e.g., the agent cannot commandeer the network driver at the highest network priority or force a read/write to another application's memory space without the other kernel and/or other application's consent).

Consider the situation where multiple low latency applications must manage a limited pool of resources (e.g., time slots); the primary user space application (e.g., video coding) and additional secondary interactive applications (e.g., remote control interface, headphones, and/or other interface devices) can internally negotiate their relative priority to the user's experience. The low latency applications can appropriately adjust their priorities based on the network interface's total bandwidth (i.e., which networking threads are serviced first and/or should be deprioritized). Additionally, the low latency applications can deprioritize non-essential best effort traffic, thereby preserving enough bandwidth cycles for e.g., video decode.

Under certain circumstances, the low latency agent 1016 may be unavailable. For example, the network interface 1010 may already be maximally utilized. In other examples, the network interface 1010 may be unable to guarantee low latency operation due to external factors (e.g., network congestion, etc.) Various embodiments of the present disclosure may handle unsuccessful low latency queries differently; for example, in some cases, if the low latency query fails then the low latency application 1012 attempts to open a channel via best effort delivery (using the flow switch). Subsequently, if the flow switch query also fails then the low latency application 1012 will fall back to socket-based access. In other variants, if the low latency query fails then the low latency application 1012 may fail without fallback. In still other variants, the low latency application 1012 may be able to handle fallback operation within the user space higher layer software.

The foregoing discussion presents various illustrative embodiments of the present disclosure, still other variations thereof may be substituted with equal success, by artisans of ordinary skill in the related arts given the contents of the present disclosure.

Low Latency Channel Event Rings—

Figure 11:
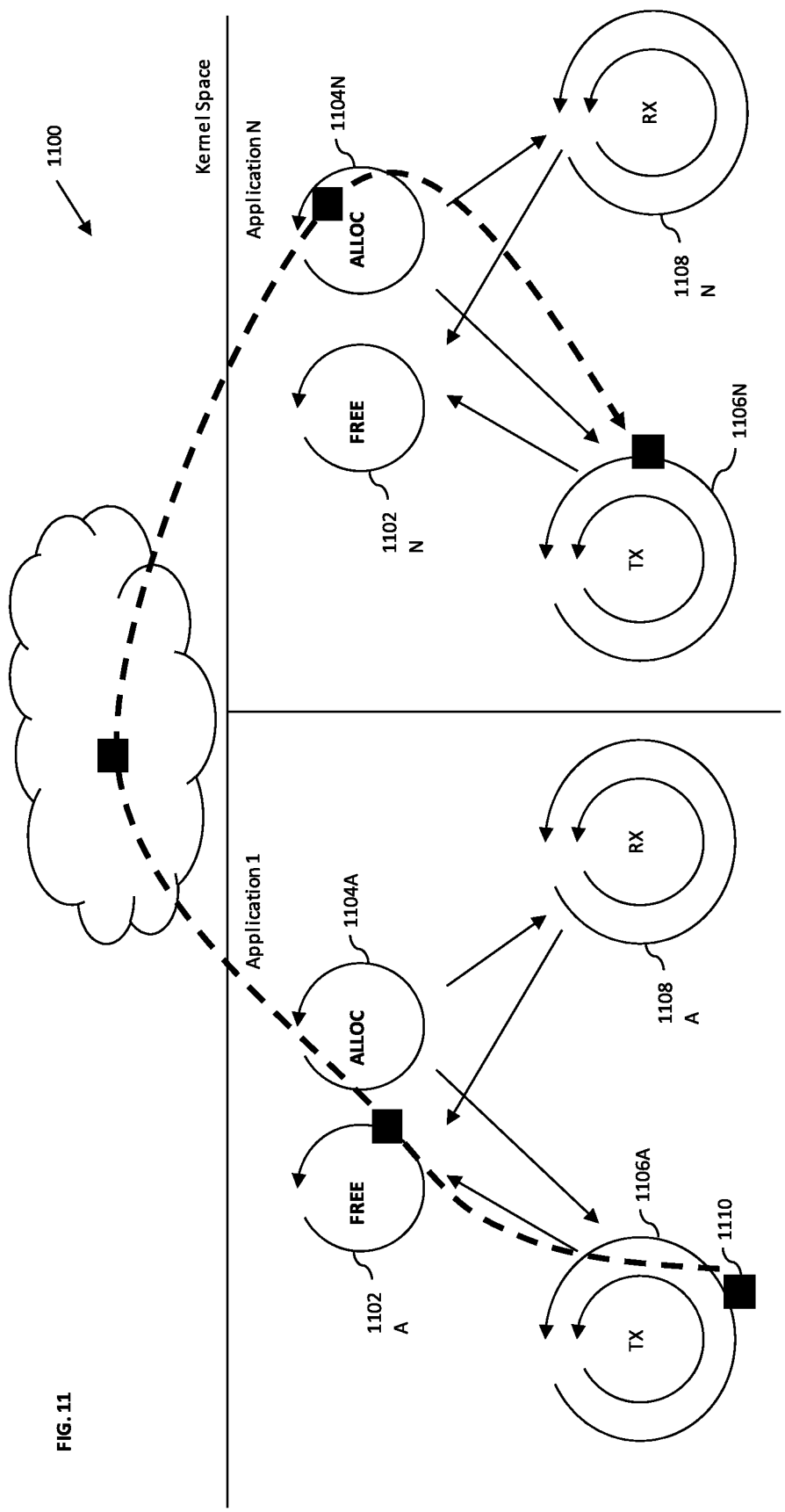
FIG. 11 is a block diagram of one illustrative technique to dynamically allocate memory resources between different user space networking stacks.

As a brief aside, FIG. 11 is a logical block diagram of one illustrative technique for dynamically allocating memory resources between different user space networking stacks. The system 1100 illustrated in FIG. 11 includes a pool of resources for a given number of applications. Each application may include four (4) data buffers, a free buffer 1102, an allocation buffer 1104, a transmit (TX) buffer 1106, and a receive (RX) buffer 1108. As illustrated in FIG. 11, each of these buffers 1102, 1104, 1106, 1108 constitute ring (or circular) buffers, although the specific type of buffer structure may be readily modified as would be understood by one of ordinary skill given the contents of the present disclosure. In some implementations, the TX buffer 1106 and the RX buffer 1108 may be combined into a single TX/RX buffer (not shown).

As illustrated in FIG. 11, a first application may determine that its allocation of TX buffers 1106A may be reduced. Accordingly, it may allocate, for example, a freed object 1110 to the free buffer 1102A. Accordingly, once the object 1110 has been freed, it may be returned to the operating system (and/or kernel) for this memory to be reclaimed. Another application may determine that its allocation of TX buffers 1106N may need to be increased. Accordingly, this freed object 1110 may be reclaimed by this other application. In some variants, the freed object 1110 may be read from the free buffer 1102A and passed along to the allocation buffer 1104N associated with the other application. The object 1110 may be then allocated to the TX buffer 1106N associated with the other application.

While the foregoing example is described in the context of freed objects 1110, it would be readily apparent to one of ordinary skill given the contents of the present disclosure that the freed objects 1110 may also constitute freed segments (slabs), freed regions. Moreover, the freed object 1110 may be allocated from the RX buffer 1108A and allocated to either of the TX buffer 1106N or RX buffer 1108N associated with the other application. In other words, buffer memory may be added to the TX/RX buffers 1106, 1108 via the allocation buffer 1104, while buffer memory may be freed from the TX/RX buffers 1106, 1108 via the free buffer 1102. Accordingly, objects 1110 may be reused or reallocated across different user stacks.

While the aforementioned dynamic allocation system is a substantial improvement over kernel space memory management, the foregoing scheme may be unsuitable for certain low latency applications. Consider a video streaming application which must play video frames at specified time intervals (frame rate). Corrupted packets may expire before than can be successfully retransmitted. In particular, the retransmitted packet may not be received in time for rendering; packet retransmissions for such low latency applications waste precious bandwidth without benefit.

Moreover, existing packet delivery paradigms (e.g., TCP/IP) assume that packets must be delivered uncorrupted and in sequence. As a practical matter, the aforementioned dynamic memory allocation can only free packet objects once they are received and sequentially reconstructed in their entirety. In other words, an expired or corrupted packet may hold up an entire line of subsequently received packets from being freed; this is especially problematic where a corrupted packet has already expired (the memory is reserved for no reason).

Further complicating the situation, there may be situations where a low latency application must wait for the missing packet. For example, certain video game applications may need to wait for packet retransmission so as to maintain game synchronization; while some amount of performance degradation is undesirable, it is nonetheless preferred over missing the data entirely (or other more draconian corrective actions).

To these ends, methods and apparatus for providing low latency channel event information to the low latency application are needed. The low latency channel event information may enable the low latency application to determine how best to handle e.g., missing, expired, and/or corrupted data. For example, the low latency application can skip the expired data and deal with the errors, wait for retransmission, or some other variant thereof.

Figure 12:
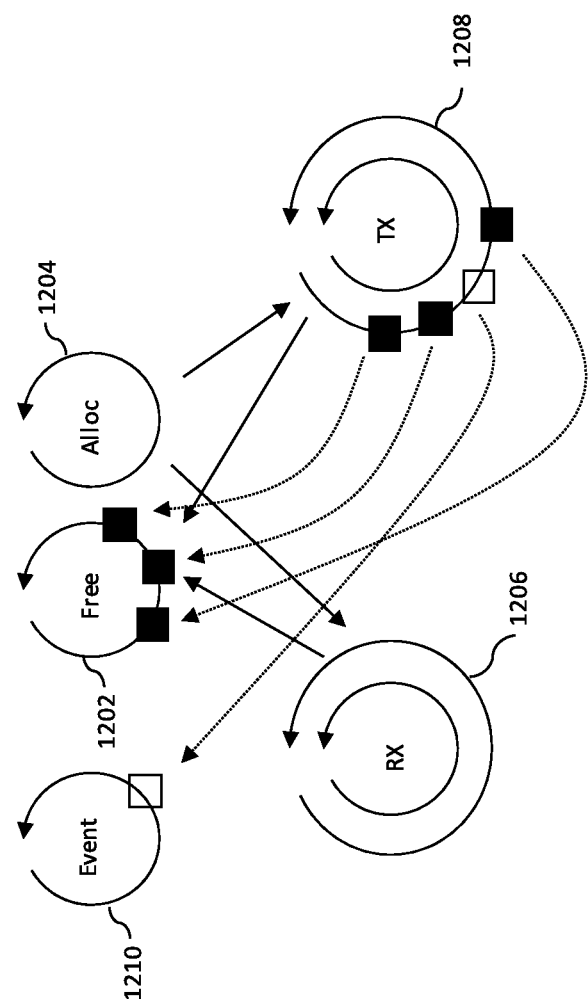
FIG. 12 is a block diagram of mechanisms for providing low latency channel event information, in accordance with various embodiments of the present disclosure.

FIG. 12 is a logical block diagram of mechanisms for providing low latency channel event information in accordance with various embodiments of the present disclosure. As shown in FIG. 12, each application may include five (5) data buffers, a free buffer 1202, an allocation buffer 1204, a transmit (TX) buffer 1206, a receive (RX) buffer 1208, and a channel event ring 1210. As illustrated in FIG. 12, each of these buffers 1202, 1204, 1206, 1208, and 1210 constitute ring (or circular) buffers, although the specific type of buffer structure may be readily modified as would be understood by one of ordinary skill given the contents of the present disclosure. Each of the buffers 1202, 1204, 1206, 1208, operate as described supra; the additional channel event ring 1210 provides event notifications that enable the low latency application to decide what to do next (e.g., continue waiting, or skip and deal with the errors).

In one exemplary embodiment, the channel event ring 1210 is a ring of event status data structures (i.e., the packet itself is not copied into the channel event ring 1210). In alternative implementations, the channel event ring 1210 may include the packet (in whole or in part). While the illustrated embodiment provides channel event notifications in a ring data structure, artisans of ordinary skill in the related arts will readily appreciate that virtually any other data structure may be substituted with equal success. For example, the data structure may be an array, a table, a vector, etc.

In one implementation, the channel event information is a metadata format that includes e.g., status, transaction identifiers, and/or time-to-live information. For example, the channel event may include a "reason" code for the failure as well as a packet id structure. The packet id is a per packet metadata which can be set on a packet by the low latency application; packet id can be used to identify either an individual or a group of packets within the networking stack and driver. The reason code may be used to determine whether the packet was corrupted, expired, missed, malformed, or otherwise damaged. Other useful information may include e.g., network congestion, likelihood of delivery, and/or other predictive information. Still other common examples of useful information may include e.g., payload type, packet sequence number, timestamp, stream identifier, and/or any number of other useful channel event information.

In one exemplary embodiment, the network interface can write event notifications for a transaction e.g., identified by a packet id. For example, the low latency application's medium access control (MAC) layer software (or its peer entity's MAC layer software) can split a data transaction into multiple real-time protocol (RTP) data packets, each having a common packet id. Both the sender and receiver can track status based on packet id. For instance, the sender can read an early channel event status without requiring the receiver to provide the normal TCP/IP status (e.g., the sender doesn't need to wait for all retransmission attempts to fail); similarly, the receiver can determine whether or not to request retransmission, or just to skip missing data, based on channel event status (instead of conventional TCP/IP status).

In one exemplary implementation, the event notification is provided back to the low latency application via callback, thereafter the low latency application can address the callback (e.g., trigger an early packet retransmission, skip retransmission altogether, etc.) As used herein, a callback includes a first set of computer instructions (or a reference to computer instructions) that are provided prior to the execution of a second set of computer instructions. For asynchronous callback, the first set is executed upon completion (or "return") of the second set of computer instructions. In contrast, synchronous callback refers to implementations where the first set is executed before the second set of computer instructions returns.

In one exemplary implementation, asynchronous callbacks enable low latency applications to receive channel event information without locking dependencies and/or excessive context switching churn. Specifically, the low latency application can complete its corrective action and immediately callback to the network driver. Corrective action can be taken without unrelated switches to other applications. In other words, asynchronous callbacks provide an additional benefit of avoiding unrelated context switching back and forth between user space and kernel space. While the following examples are provided in the context of asynchronous callbacks, artisans of ordinary skill in the related arts given the contents of the present disclosure will readily appreciate that synchronous callbacks may be substituted with equivalent success.

Asynchronous callbacks for channel event information may be useful wherever the low latency user stack has explicit and/or immediate need for a corrective action. For example, the low latency user stack may need to immediately identify corrective action for its packets. To achieve that, the network driver calls into the low latency stack to determine corrective action, and in doing so also registers a callback. The registered callback is later used by the user stack to identify the proper corrective action (drop, wait) to the network interface asynchronously. The network interface is immediately called to perform the identified corrective action. More directly, the corrective action can be treated by the network driver as a prioritized low latency application call.

While the foregoing discussion of channel event reporting is presented in the context of low latency operation, artisans of ordinary skill in the related arts will readily appreciate that the techniques described herein may be broadly applied to a variety of different applications. Other channel event rings may be used for best effort data, background refresh data, constant and/or variable bit rate media (e.g., time critical audio and/or video), constant bit rate media, "excellent effort" (non-time critical, but loss sensitive), time and/or data critical applications, network signaling, etc.

The foregoing discussion presents various illustrative embodiments of the present disclosure, still other variations thereof may be substituted with equal success, by artisans of ordinary skill in the related arts given the contents of the present disclosure.

Low Latency Interface Advisory—

In a related but distinct aspect, low latency applications may benefit from device-wide network interface advisory information. Notably, the network interface is shared across different applications; for example, all applications share the same Wi-Fi interface. Network interface metrics are different than packet loss metrics (which are specific to links). More directly, there may be network interface considerations that are not specific to the low latency application, but useful, nonetheless. As but one example, a non-channel specific network interface condition may include e.g., periodic link quality status, poor signal quality, network congestion. Network interface advisory information may be useful for triggering early corrective action (e.g., the application may switch to a different modulation and/or coding scheme, initiate handover, change buffer sizes, and/or any number of other potential preemptive actions.)

In one embodiment, network interface advisory information includes a link quality advisory. In one exemplary embodiment, network interface advisory information may be normalized across different network technologies based on low latency application specific mappings. For example, network interface advisory information may be represented with a normalized range (from e.g., 1-100). The normalized range enables different radio access technologies to be roughly compared regardless of the underlying metric; for example, cellular technologies may natively use signal-to-noise ratio (SNR) whereas wireless local area networks may use received signal strength indication (RSSI). Even though SNR and RSSI cannot be directly compared, a normalized mapping enables approximate comparison.

As a brief aside, radio link quality information may change too quickly to be directly predictive of packet loss. Perfect accuracy under these conditions is not useful; rather, a generalized approximation may assist in indirectly inferring packet loss due to changes in link quality between different radio technologies. For example, a device that is moving away from its wireless access point and/or a cellular link may see a randomly changing, but generally declining performance. Under such situations, an absolute measure of link quality (e.g., absolute SNR decay versus RSSI decay) is not nearly as helpful as a relative measurement (e.g., normalized decay of a first link compared to the normalized decay of the second link.)

In one exemplary embodiment, technology specific mappings may be pegged within a normalized range. Empirical performance assessments may be collected for a broad cross section of different low latency applications and correlated to performance. As but one such example, under cellular link performance e.g., at a specific SNR is roughly 85% of maximum and is thus assigned a normalized rank of 85. Wi-Fi performance at a specific RSSI is roughly 85% of maximum and may thus also be assigned a normalized rank of 85. In this manner, empirically determined mappings may be used to provide an apples-to-apples comparison across different radio access technologies.

In another embodiment, link quality mappings may be configurable based on driver-specific considerations. For example, different component manufacturers and/or component vendors may generate mappings that are specific to their radio access technology. In some cases, manufacturers and vendors have the native expertise and incentives to provide accurate feedback because incorrect feedback often results in sub-standard performance.

In still other alternative embodiments, technology specific mappings may be defined on an application specific basis. For example, the network interface advisory may provide a raw metric (e.g., SNR, RSSI) which each application may interpret differently. For example, certain types of applications may be more or less sensitive to variations in link quality; e.g., a robust error checking algorithm may tolerate variances in SNR versus RSSI differently.

More generally, artisans of ordinary skill in the related arts will readily appreciate that the foregoing examples are merely illustrative of the broader principles described herein. Specifically, radio link quality measurements provide non-channel specific link assessment in a manner that augments other measurements; for example, active queue management (AQM) directly measures channel specific packet loss, but only indirectly reflects link quality. Virtually any metric may be substituted with equal success, given the contents of the present disclosure.

Figure 13:
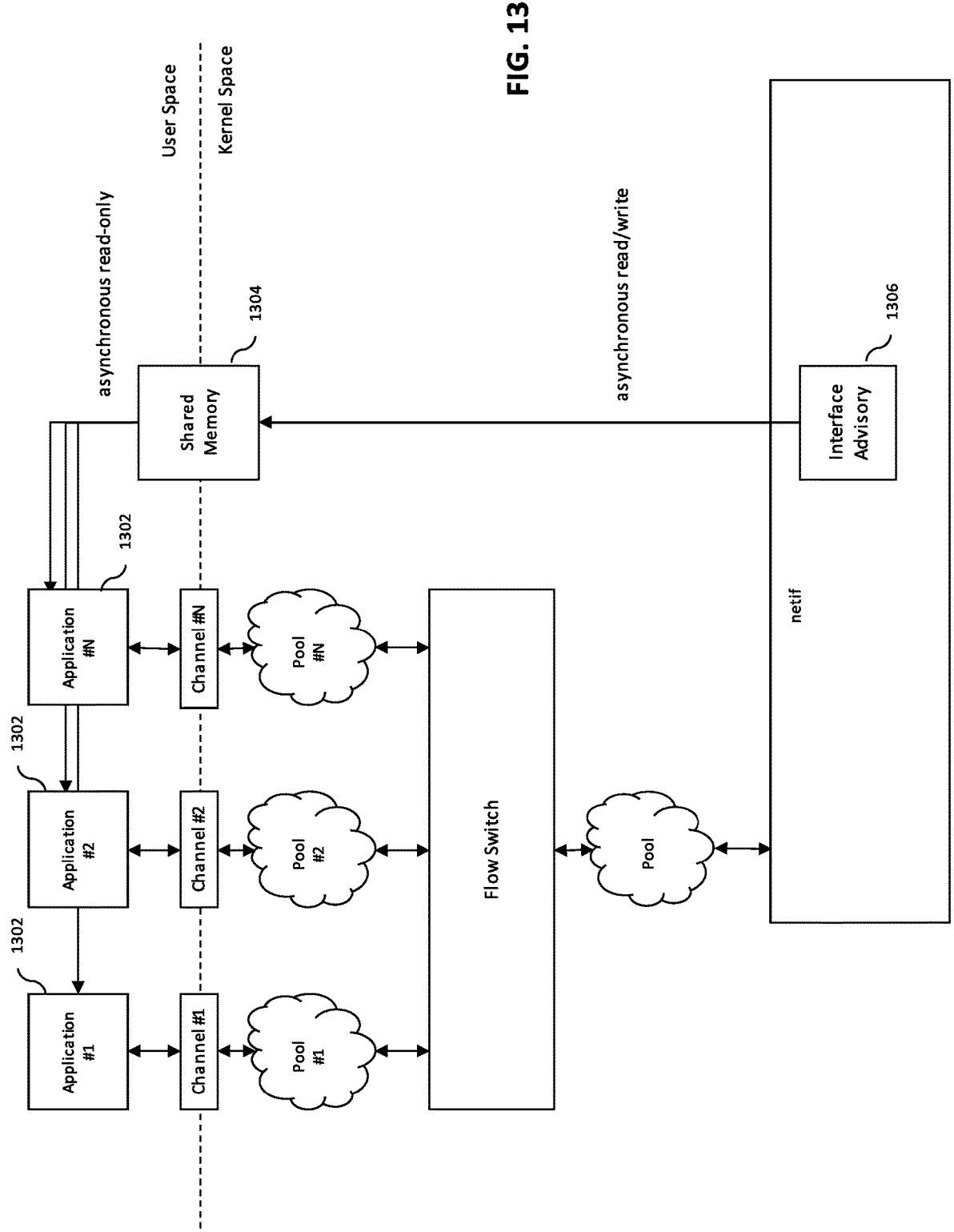
FIG. 13 is a block diagram of one exemplary interface advisory, in accordance with the low latency networking architecture.

Referring now to FIG. 13, a logical block diagram of one exemplary interface advisory in accordance with the low latency networking architecture is shown. As illustrated therein, the network interface advisory 1306 provides useful device-wide information to the low latency applications 1302, via a memory interface 1304.

In one embodiment, the memory 1304 is shared across multiple user space applications 1302. As a practical matter, shared memory operation may be more efficient to disseminate non-channel specific network interface advisory information. In other implementations however, the memory 1304 may be specific to each user space application 1302; individualized treatment may require more memory, etc. however individualized treatment may be particularly useful where network advisory information is uniquely handled by each user space application. For example, individualized reporting may be useful where different applications require different rates of updating, or differently normalized reporting, etc.

In one embodiment, the memory 1304 may only be securely changed by the kernel space network interface advisory 1306. In one exemplary embodiment, the shared memory 1304 may be read/written by the kernel space network interface advisory, however each of the user space applications 1302 may only read the network interface advisory. In other implementations, the network interface advisory 1306 may be read/written by the user space application; such implementations may be useful to e.g., provide informal advisory information between user space applications. For example, a first application could indicate that it intends to consume 85% of its maximum bandwidth; other applications could adjust their behavior accordingly. In a related embodiment, certain network drivers can be handled within user space; user space network drivers may read/write to the shared memory for the benefit of other user space applications.

In one exemplary embodiment, the network interface advisory is read and written to asynchronously. In other words, reading and writing occur without any timing relative to one another; e.g., the network interface advisory 1306 may write to the shared memory 1304 at any time, without regard to when the one or more user space applications 1302 read the shared memory. Asynchronous operation reduces the inter-process coordination; moreover, as previously alluded to, synchronous access may be unnecessary because most network advisory information changes so quickly (e.g., the wireless channel conditions).

In other embodiments, the network interface advisory is read and written to synchronously. Synchronous updates consume more processing and/or memory overhead; however synchronous updating may be preferred where time and accuracy are closely related.

In one exemplary embodiment, the network interface advisory may include validity information. For example, in order to prevent race conditions for asynchronous systems, each advisory entry may include a corresponding check value (hash). In other words, during an update, the advisory value is written first, and a check hash is written thereafter. During a read, the value is checked against the hash. If the check value doesn't match the read value, then the read was performed before the write completed (i.e., the read value is invalid due to a race condition.)

While the foregoing example is presented in the context of a hashed check value, other techniques for catching and/or preventing race conditions may be substituted with equal success. For example, alternative implementations may use locks, interrupts, semaphores, and/or any other mechanism to explicitly signal when a value is valid (or invalid.)

In one exemplary embodiment, the network advisory data structure includes a time stamp, the advisory value, and a check hash. Other embodiments may substitute different time structures (absolute time, relative time, effective time), data structures (raw data, relative data, enumerated values ("good", "bad", etc.), and/or any other form of advisory format), and/or other forms of validity (CRC, validity flags, etc.) The foregoing discussion presents various illustrative embodiments of the present disclosure, still other variations thereof may be substituted with equal success, by artisans of ordinary skill in the related arts given the contents of the present disclosure.

Methods

Existing quality-of-service (QoS) and/or class-of-service (CoS) guarantees rely on contracts between network entities to ensure that resources are available to deliver packets from source to destination. For example, data packets that include an IEEE 802.1Q header may recommend how the packet should be handled (e.g., video packets handled with less than 100 ms latency, voice packets handled with less than 10 ms latency, etc.) Alternatively, some latency management techniques rely on source and/or destination processing to compensate for packet loss and/or low latency (e.g., forward error correction (FEC), automatic repeat request (ARQ)). However, QoS/CoS does not specify how individual network entities comply with the QoS/CoS contract, nor does QoS/CoS coordinate/specify packet processing within any specific network entity. More directly, existing network management techniques do not coordinate application requirements with kernel space packet processing due to the aforementioned assumptions that underlie modular design and abstraction.

Figures 14A, 14B:
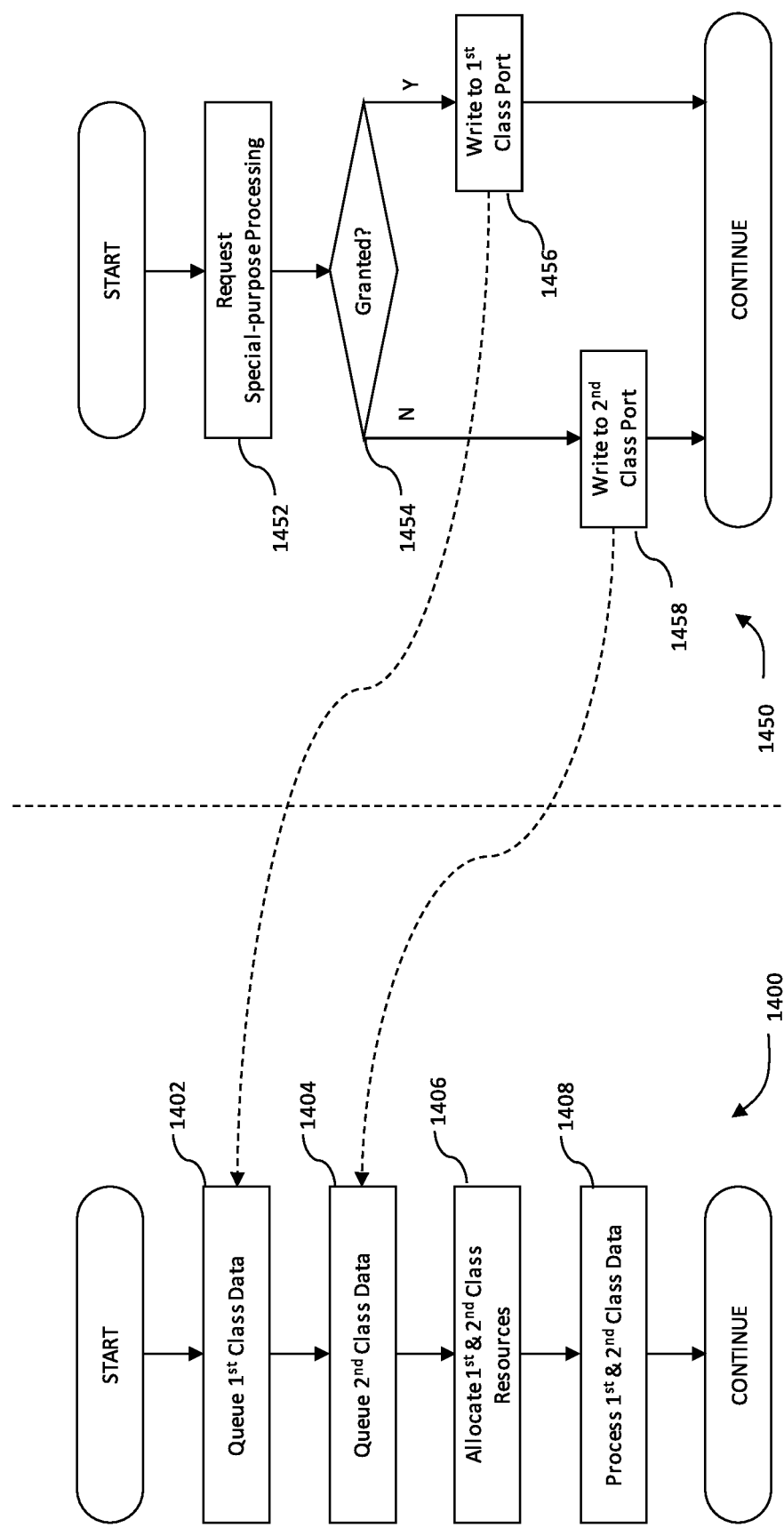
FIGS. 14A-14B are logical flow diagrams of exemplary methods for multiplexed traffic class-based transfer within user space networking stack infrastructures, in accordance with the various principles described herein.

Referring now to FIG. 14A, one exemplary method 1400 for multiplexing different traffic classes of data is shown. While the following discussion is presented in the context of a user space networking stack infrastructure, the principles described herein are broadly applicable to any traffic class of data that requires specialized handling by a kernel process in order to enable source or destination operation (e.g., user space applications).

At steps 1402 and 1404 of the method 1400, data is queued into a first traffic class and a second traffic class. In one embodiment, a low latency packet pool holds data that is characterized by a maximum latency and/or latency jitter tolerance for kernel processing that may be specified by e.g., the source or destination application. A non-low latency packet pool holds data that is characterized by flexible latency or latency that is handled external to the kernel space. More generally, data may be queued into data structures based on any data processing requirement or consideration.

Notably, while the illustrative discussions presented supra describe "best effort" delivery, artisans of ordinary skill in the related arts will readily appreciate that non-low latency delivery may encompass a variety of data types. The term "best effort" refers to a service that does not specify, or require, any service differentiation. The aforementioned IEEE 802.1Q standard specifies other non-low latency traffic that may include, without limitation: background refresh data, constant and/or variable bit rate media (e.g., time critical audio and/or video), constant bit rate media, "excellent effort" (non-time critical, but loss sensitive), time and/or data critical applications, network signaling, etc.

As a brief aside, within the processing arts, computer system organization may be bifurcated into two logical functions: the data path, and its corresponding control logic. The data path refers to those portions of the hardware, software, and/or processing logic that generate output data based on input data. The data path performs e.g., data operations (add, subtract, multiply, divide, etc.) as well as data accesses (e.g., read, write, etc.) In contrast, control logic manipulates the data path's operation; e.g., control logic selects which operations are performed, identifies the data that is input and how the output data is handled, etc.

In one embodiment, the different traffic classes are associated with different data paths. Each data path has different operational characteristics; in one such implementation, at least one data path has been optimized for a special-purpose operation. For example, the low latency data has a data path that is characterized by reduced functionality, reduced context switching, and/or improved latency. In one specific implementation, the low latency data path does not perform one or more of copy-checksum processing, receive mitigation logic, and/or active queue management. Additionally, the low latency packet pool may support zero-copy access to directly transmit data to/from the low latency packet pool (further reducing packet processing latency). In contrast, the non-low latency data path provides general-purpose packet processing capabilities that can (in some cases) be configured, enabled and/or disabled. Notably, merely disabling functionality within the general-purpose data path does not remove the corresponding data path logic; instead, the corresponding control logic dynamically determines whether execution is required at run time and enables or disables the data path accordingly.

More generally, artisans of ordinary skill in the related arts will readily appreciate that partitioning packet processing into distinct data paths enables the kernel to reduce the complexity of the control logic and context switching associated therewith. Notably, the underlying data path complexity is distinct from control logic, and in some cases may be made more complex than general-purpose processing. As but one example, an encryption/decryption data path may implement a secure packet pool with "computationally hard" kernel space encryption that is much more resource intensive than the corresponding general-purpose data path. Nonetheless, the encryption control path logic may be simplified to only address encryption operation (e.g., encryption can be batched and performed in the encryption data path with minimal context switch interruptions.)

As previously alluded to, the various principles described herein are broadly applicable to any application which preferentially avoids general-purpose functionality, in part or in whole. General-purpose networking stack functionality refers to packet processing that is performed in accordance with commonly accepted standards that are promulgated for use within the commodity networking arts (e.g., TCP/IPv4, IPv6, IEEE 802.1Q, etc.) In contrast, special-purpose network functionality may be performed based on explicitly provided (or implicitly inferred) endpoint usage criteria. Examples of special-purpose networking functionality may include, without limitation, fixed jitter delivery (isochronous traffic), high throughput operation, virtualized "circuit-switched" applications, encryption/decryption, secure channel signaling, channel-specific routing, and/or other application-specific data traffic.

At step 1406 of the method 1400, resources are allocated for data path processing of the first traffic class and the second traffic class. As previously alluded to, the various techniques described herein enable kernel space packet processing to coordinate operation in view of application requirements. Thus, certain embodiments may consider e.g., source and/or destination operation when allocating resources for data path processing. In one embodiment, the kernel space packet processing allocates resources between a special-purpose data path and a general-purpose data path; for example, the kernel space allocates a first set of time slots to low latency packet processing, and a second set of time slots to non-low latency packet processing. In one specific implementation, the time slots are assigned via a time division duplex (TDD) multiplexing scheme for use in a contention-based Internet Protocol (e.g., carrier sense multiple access with collision avoidance (CSMA-CA)).

In some cases, resources may be allocated based on endpoint usage. For example, certain usage scenarios may dedicate a significant portion of existing processing and/or memory resources to prioritize one application over others (e.g., the user streams a high-resolution video and has no other prioritized applications). As but one such example, time slots may be allocated according to an expected usage ratio (e.g., low latency traffic may be allocated 60% of the time slots for low latency streaming video, other traffic may be allocated the balance). In other situations, the individual data path processing may be load balanced and/or flexibly accommodate other simultaneous data path operation (e.g., the kernel space may dynamically prioritize low latency streaming video based on external local network throttling.) In such cases, the allocation may be semi-fixed (periodically re-evaluated), or dynamically adjusted. In still other cases, resource allocations may be preferentially allocated for one or more data paths (e.g., the low latency data path can take as much or as little as required), and the remaining resources are used for other data paths (e.g., general-purpose packet processing). Other schemes for resource scheduling may include without limitation: round robin, weighted round robin, deficit scheduling, etc.

While the foregoing discussion is presented in the context of kernel packet processing in view of endpoint usage requirements, artisans of ordinary skill in the related arts given the contents of the present disclosure will readily appreciate that the kernel must prioritize and/or balance many other competing interests. As previously alluded to, processing and/or memory resources may be allocated (or de-allocated) and enabled (or disabled) based on a variety of system considerations. For example, memory architectures often optimize access time, size, and/or cost; similarly, processor scheduling may manage process threads so as to optimize power consumption and performance. Exemplary variants may consider e.g., ongoing kernel tasks (e.g., security, etc.), existing resource allocations (e.g., other low latency applications), and/or external network limitations (e.g., channel conditions, etc.). In some cases, limiting factor analysis may be used to moderate resource allocations between the data paths. For example, the low latency data path may only be allocated time slots when existing network conditions provide reliable channel conditions that would substantially benefit therefrom; otherwise, low latency applications are processed via the existing general-purpose data path because kernel processing latency is a negligible portion of the overall packet processing delay.

In some embodiments, data path processing and/or memory resources may be further configured based on source and/or destination specific considerations. For example, an endpoint application (e.g., video player) may specify a fixed memory buffer size that is required for operation. As noted supra, special-purpose processing may be optimized for e.g., known data structures and formats, this can further reduce control logic and/or data path complexity. In other embodiments, data path processing and/or memory resources may be allocated based on overall system limitations. For example, low latency data (which may originate from multiple low latency applications) may be queued into a low latency pool of a fixed size to optimize low latency data path throughput, whereas non-low latency data may be queued into non-low latency pools that are flexibly allocated based on overall system load.

Artisans of ordinary skill in the related arts will readily appreciate that the principles described herein provide predictable performance for endpoint applications. As a practical matter, processing low latency data separately from non-low latency data (e.g., best effort, background, etc.) ensures that low latency operation is substantially unaffected by non-low latency traffic and vice versa. More generally, the various principles described herein are broadly applicable to any applications that are both self-contained (or otherwise benefit from isolation) and resource intensive requirements.

At step 1408 of the method 1400, the queued data is processed in accordance with the allocated resources. For example, low latency data may be processed via a zero-copy transfer for delivery in the corresponding time slot allocations; the remaining time slot allocations are used for general-purpose packet transfer.

While the foregoing discussion is presented in the context of a time division duplex (TDD) multiplexer for use in a contention-based packet transfer (e.g., carrier sense multiple access with collision avoidance (CSMA-CA) Internet Protocol (IP)), other data transfer technologies may be substituted with equal success. Examples of data transfer technologies that are popular in wireless networking include without limitation frequency division duplex (FDD), time-frequency resource multiplexing (also commonly referred to as orthogonal frequency division multiplexing (OFDM)), and/or spreading code-based multiplexing (commonly used within code division multiple access (CDMA)). Examples of data transfer technologies that are popular in optical networking technologies include without limitation, coarse wave division multiplexing (CWDM), and dense wave division multiplexing (DWDM). Similarly, while the foregoing example is presented in the context of full duplex operation (both transmit and receive), other duplexing schemes may be substituted with equal success e.g., half-duplex (switching between transmit and receive), simplex (unidirectional), etc.

FIG. 14B, one exemplary method 1450 for requesting special-purpose packet processing is shown.

As previously alluded to, special-purpose processing may require resource allocation and/or control logic and data path processing in addition to ongoing kernel space operation. Thus, special-purpose packet processing may be requested, and the request may be granted or denied by the kernel process (steps 1452 and 1454 of the method 1450.) More generally, while the following discussion is presented in the context of a user space application that requests special-purpose handling from a kernel process, the principles described herein may be broadly applied to requests made and/or granted by less privileged entities (e.g., daemon processes, other kernel space processes, external network entities, peer devices, etc.)

In one exemplary embodiment, an explicit agent-based discovery mechanism may be used to request, negotiate, and open/close channels for low latency traffic. For instance, a low latency network extension may enable a user space application to access a low latency channel as well as expose additional operational parameters specific to low latency operation (e.g., packet size, error correction, latency, latency jitter, throughput, etc.)

Due to the sensitive nature of kernel space operation, the request process may be opaque to the requesting user space application in some embodiments. For example, the user space application may only receive notification that low latency operation is available or unavailable. Obscuring kernel space burden may be preferred because certain malicious attacks and/or activity rely on kernel space visibility to detect latent weakness to exploit and/or the effectiveness of an ongoing attack. In other embodiments, the request process may be relatively transparent to the requesting user space application. For example, the kernel space may be unable to fulfill the requested service as it was made but may be able to respond if the request was amended to require less resources and/or postponed. Still other variations may use a hybrid of the foregoing; for instance, requesting applications may receive varied levels of information based on e.g., privilege. For example, $2^{nd}$ party applications (trusted vendor applications) may be privy to rejection information, whereas $3^{rd}$ party applications (untrusted applications) may not receive any subsequent information.

While the foregoing discussion is presented in the context of a software agent that negotiates with the kernel and other software agents on behalf of the user space application, other techniques for requesting special-purpose processing may be substituted with equal success by artisans of ordinary skill in the related arts, given the contents of the present disclosure. Examples of service discovery and request techniques include, without limitation: explicit notification (e.g., agent-based handling, etc.) and/or handshake protocols, dedicated signaling (e.g., by port number, channel, or other source/destination identifier), service calls, etc.

When special-purpose packet processing is available, a channel is configured based on user space considerations and data may be written to the channel in accordance with special-purpose operation (step 1456 of the method 1450). In some embodiments, the kernel space process may notify the requesting process of the channel configuration. In other embodiments, the user space process may infer (unless instructed otherwise) that its requested resources were granted without modification. For example, a user space process that requested a maximum latency and minimum throughput may be advised that as to its granted throughput (the latency is assumed to be granted without modification).

When special-purpose packet processing is not available, the user space configures itself for general-purpose operation (step 1458 of the method 1450). In some cases, the user space application may revert to legacy processing at reduced quality (e.g., relying on source and/or destination processing to compensate for packet loss and/or low latency). In other cases, the user space application may postpone operation until kernel resources and/or network conditions change, or abort operation altogether.

Figures 15A, 15B:
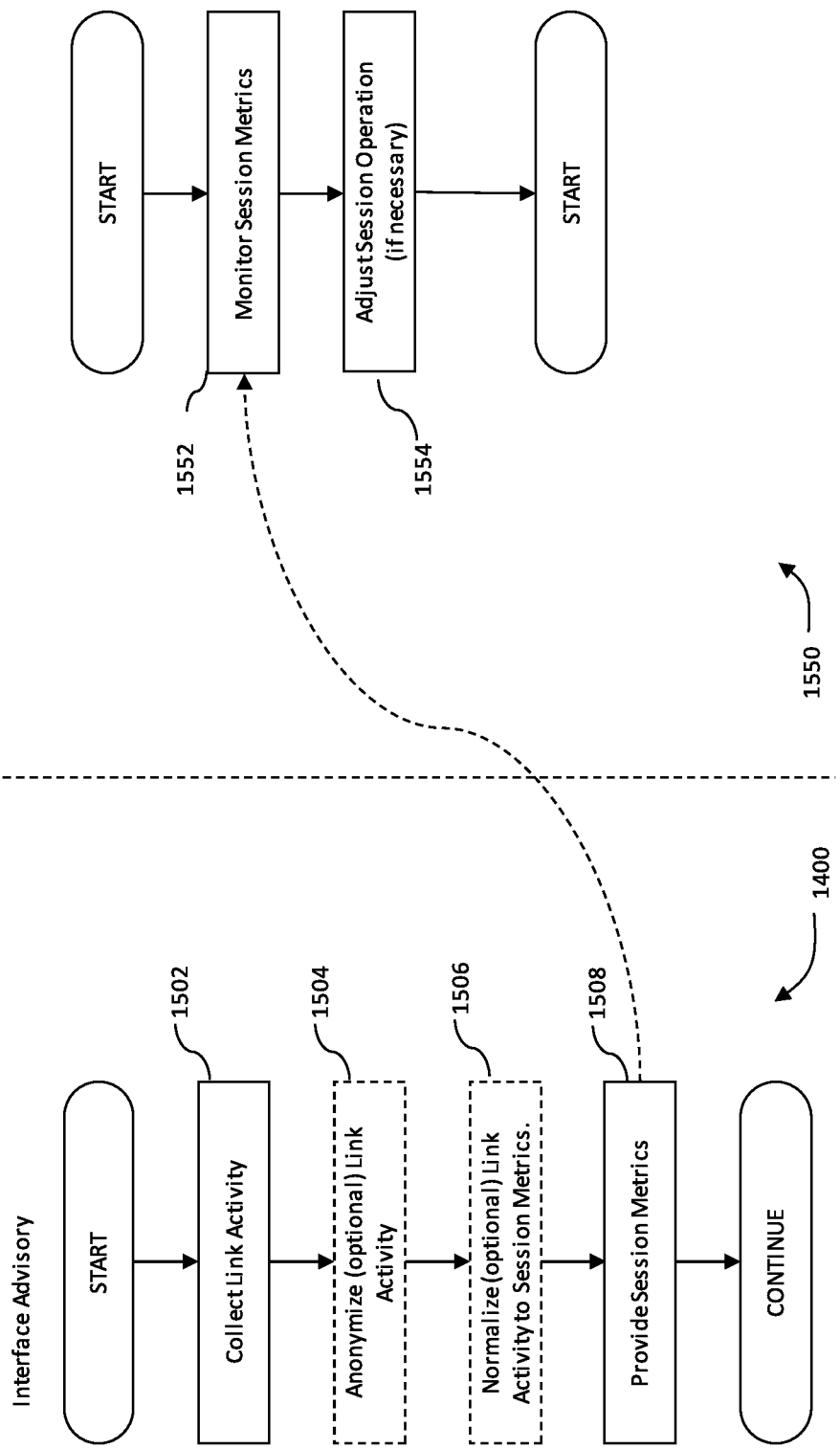
FIGS. 15A-15B are logical flow diagrams of exemplary methods for providing session information to user space applications, in accordance with the various principles described herein.

FIGS. 15A-15B are logical flow diagrams of exemplary methods for channel advisory and corresponding low latency operation based thereon, in accordance with the various principles described herein.

As a brief aside, various embodiments of the present disclosure provide network connectivity seamlessly across a myriad of network technologies. Even though most network technologies provide their own network activity metrics, these do not directly correspond to network activity metrics in other technologies. Cross platform performance comparisons between different network technologies cannot be performed without a technology agnostic metric.

Additionally, existing techniques for reporting network activity often identify an aggregate usage rather than what a user space application could reasonably expect to experience. Existing monolithic communication stacks only provide limited visibility into the network transport layer functionality. For example, a device may receive 10 Gbps that is split across many different concurrently running user space applications; the user space application does not have visibility into its portion of the total bandwidth (e.g., for its own future scheduling and optimizations).

Ideally, user space applications should be able to operate at a layer of abstraction above the underlying network transport layer; thus, an "apples-to-apples" metric for comparing different network conditions is needed. In other words, the kernel space has visibility into how the technology specific metrics affect network connectivity and can provide metrics for objective comparisons; various embodiments described herein provide technology agnostic session advisory metrics.

At step 1502 of the method 1500, link activity metrics are collected. As used herein, the term "link activity metrics" refers to metrics that are collected between adjacent nodes of a packet switched network. Generally, link activity metrics may refer to physical connectivity measurements (e.g., received signal strength indication (RSSI), signal-to-noise-ratio (SNR), etc.), data link layer measurements (e.g., bit error rate (BER), packet loss, etc.) and/or any other link specific information.

While the aforementioned illustrative embodiments have described the use of e.g., signal-to-noise ratio (SNR) and received signal strength indication (RSSI), virtually any metric for physical link conditions may be substituted with equal success. Other examples of such metrics include without limitation: carrier-to-noise-ratio (CINR), energy per bit to noise density ($E_bN_0$), signal-to-interference-ratio (SIR), signal-to-interference-and-noise (SINR), received signal strength (RSS), received energy, etc.

In some embodiments, the link activity metrics and their effects may be further apportioned or otherwise associated with corresponding sessions. For example, packets for a particular source or destination, that are dropped or corrupted in the radio link may be identified. As used herein, the term "session" refers to data transfer between endpoints of a packet switched network. Other examples of session information may include without limitation: bit error rate (BER), packet error rate (PER), block error rate (BLER), latency, throughput, etc.

Conceptually, link activity metrics provide visibility into only one link of the chain of links in an ongoing data session. However, the physical radio link is often a substantial bottleneck for the overall session performance. Thus, link activity metrics are helpful in assessing the overall quality of network connectivity. More generally however, virtually any metric for overall network performance may be substituted, used in addition to, or in lieu of, the foregoing metrics. Other useful metrics for assessing overall session may include e.g., historic information (peak hours), geographic information (connectivity hotspots, blackout regions, etc.), and/or other measures of reliability information.

While the foregoing discussion is presented in the form of link activity metric collection based on ongoing activity, other techniques may be substituted with equal success. For example, link connectivity may be actively determined or probed (e.g., via network pings, beacons, or other sounding mechanism). In other cases, link metrics may be passively measured based on other known information; for example, radio traffic can be probed based on resource utilization, contention-based technologies may estimate load based on successful (or unsuccessful) back-off attempts, etc. Still other networks may provide explicit and/or implicit information regarding current network status; examples of such advisory mechanisms include broadcast network congestion information (e.g., cognitive pilot channel information, etc.) as well as broadcast scheduling information.

Different network technologies have different scheduling capabilities. Thus, link activity metric collection may be performed periodically, intermittently, or on an as-needed basis. For example, most cellular networks provide periodic paging channel signaling to connect cellular calls; as a result, cellular phones constantly measure network connectivity. In contrast, Wi-Fi networking is designed to provide spot service and/or ad hoc connectivity, thus Wi-Fi measurements may be collected infrequently (or only when needed). More generally, artisans of ordinary skill in the related arts will readily appreciate that the principles described herein are broadly applicable to a variety of different networking technologies, which may vary widely in their operation and/or reporting complexity.

In some embodiments, link activity metrics may be anonymized so as to protect sensitive kernel space information and/or private user space information (step 1504 of the method 1500). Notably, network connection history may be used to identify a user's previous whereabouts and/or ongoing usage habits, similarly many kernel intensive tasks are tightly coupled with network connectivity. Such information is commonly abused by malicious parties; thus, various embodiments anonymize collected link activity metrics so as to ensure that such information is not intentionally misused, or inadvertently leaked.

There may be some legitimate uses for disambiguated metrics, thus other implementations may use link activity metrics without anonymization. For example, network connectivity history can be used for resource planning and/or optimized service provision. Still other variations may use a hybrid of the foregoing; for instance, certain entities may receive non-anonymized information based on e.g., privilege and/or accountability. In other examples, link activity metrics may be exposed for sufficiently privileged applications. This may be useful to diagnose issues in network operation and/or streamline unnecessary applications.

At step 1506 of the method 1500, link activity metrics may be normalized to create session advisory metrics. In one embodiment, the kernel normalizes the technology specific link activity metrics based on their peak performance. For example, even though Wi-Fi measurements (RSSI) do not correspond to cellular measurements (SNR), they are self-consistent as a relative measure. In other words, a Wi-Fi link operating at 85% efficiency may be assessed as a unit-less session advisory metric of 85. The unit-less session advisory metric can provide a relatively good estimate of overall session performance, in view of previous operational history (e.g., a representative sampling of performance data, collected across similar circumstances.)

While the foregoing discussion is presented in the context of a unit-less session advisory metric that is agnostic (and broadly applicable) to any underlying network, unit-based metrics may be used with equal success. For example, user space applications may specify or require specific session parameters. Consequently, some embodiments may normalize link metrics as a function of application space requirements; e.g., a Wi-Fi link and a cellular link may both provide the approximately the same performance and may be described with a unit-based session advisory metrics (e.g., both Wi-Fi and cellular connectivity may be described as providing e.g., packet throughput, bit rate, and/or latency).

More generally artisans of ordinary skill in the related arts, given the contents of the present disclosure, will readily appreciate that a variety of techniques may be used to normalize link advisory metrics for session advisory. Examples of other schemes may include e.g., mapping link activity metrics to session advisory metrics based on ranges of performance, etc.

At step 1508 of the method 1500, session advisory metrics are provided to interested entities. In some embodiments, session advisory metrics may be actively pushed to user space applications. For example, the session advisory metrics may be provided via event notification data structures for specific user application operation. In some such embodiments, the event notifications may further include call back information that greatly reduces context switching between kernel space and unrelated user space processes.

In other embodiments, session advisory metrics may be updated by the kernel and retrieved by the user space applications on an as-needed basis. In some variants, the session advisory metrics may be provided via an advisory area with validation checks. The validation checks enable any interested party to determine whether or not the session advisory metrics are fresh or stale without explicit kernel verification. Advantageously, this reduces unnecessary signaling (e.g., only interested parties seek the information, without handshaking protocols).

Referring now to FIG. 15B, session advisory metrics may be used to modify user space operation.

At step 1552 of the method 1550, session metrics are monitored. In some cases, the session metrics may be received. For example, the user space application may be alerted as to a current (or predicted) network event. In other cases, the session metrics may be requested or otherwise queried; for example, the user space application may check in advance whether or not a sufficient bandwidth exists to provide a service. As but another example, the user space application may request session metrics when performance falls below acceptable thresholds.

In one exemplary embodiment, the session metrics are provided in a channel event data structure that provides a running account of packet delivery status for a specific packet flow. The packet delivery status may identify which packets are queued for transfer, successfully transferred, unsuccessfully transferred, expired, skipped, in the process of transfer (e.g., retransmitted, etc.) Unlike traditional network stacks that aggregated all packet transfers via a global mbuf pool, exemplary embodiments of the present disclosure individually track packet flows. Thus, the session metrics may be provided on a per flow basis. In other words, the packet delivery status is specific to the ongoing session between endpoints.

While the foregoing example is provided in the context of a single flow for a single user space application, artisans of ordinary skill in the related arts will readily appreciate that multiple flow and/or cross flow reporting may be substituted with equal success. For example, consider the scenario where multiple user space applications coordinate their operation. With appropriate privileges, each application may be able to identify bottlenecks in not only their own operation, but their related applications as well. This may be particularly useful to balance and/or allocate processing resources; e.g., bottlenecked processes can suspend activity, reducing unnecessary processing and/or network load.

In another exemplary embodiment, the session metrics are provided in a channel advisory data structure that provides channel condition information. Various embodiments described supra, provide either or both unit-less and unit-based channel advisories. More generally, unlike traditional network stacks that strictly enforced the logical separation between kernel and user space, various embodiments described herein provide may expose limited link information to the user space.

While the foregoing example is provided in the context of channel link information, artisans of ordinary skill in the related arts will readily appreciate that virtually any kernel information may be substituted with equal success. For example, in some cases, the kernel may provide processing and/or memory load information. As with network channel conditions, processing load and/or memory are highly dynamic and cannot be reported instantly, nonetheless general trend information with regard to computation load can be helpful for user space operation.

While the present disclosure is directed to user space networking architectures, artisans of ordinary skill in the related arts, given the contents of the present disclosure will readily appreciate that the principles described herein may be broadly applied to other network architectures. For example, the session advisory metrics may be received or obtained via out-of-band signaling at either the source or the destination. More generally, the various principles described herein enable a kernel to provide session advisory information to affect session operation (between endpoints), based on its (the kernel's) link information (between adjacent nodes of the network).

Referring back to FIG. 15B, the user space application (or other endpoint) may adjust operation based on the monitored session metrics (step 1554 of the method 1550).

In one exemplary embodiment, the user space application may use packet delivery status to determine corrective action. For example, the application may skip missing or expired packets or wait for retransmission based on packet delivery status and its own usage considerations. Other implementations may modify data usage, adjust performance, and/or implement alternative data solutions. In some cases, the user space application may prompt the user for guidance (e.g., continue with reduced performance, or abort). A myriad of other adjustments may be substituted with equal success, given the contents of the present disclosure.

In another exemplary embodiment, channel condition information can be used to initiate, configure, and/or adjust session operation based on channel conditions. Other implementations may modify data usage, adjust performance, and/or implement alternative data solutions. More generally, artisans of ordinary skill in the related arts, given the contents of the present disclosure will readily appreciate that virtually any corrective action may be substitute with equal success, the foregoing being purely illustrative.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A user apparatus, comprising:
a network interface configured to communicate with a network;
a digital processor apparatus; and
a storage apparatus in data communication with the digital processor apparatus and comprising a storage medium having one or more computer programs stored thereon, the one or more computer programs configured to, when executed by the digital processor apparatus, cause the user apparatus to:
allocate a first resource for a first traffic class and a second resource for a second traffic class, wherein the first traffic class is associated with a user space low latency application and the second traffic class is associated with non-low latency applications;
cause the user space low latency application to request low latency operations from a kernel space application via a low latency agent; and
transact the first traffic class via the first resource and the second traffic class via the second resource.

2. The user apparatus of claim 1, further comprising logic configured to perform a copy-checksum operation on only the second traffic class.

3. The user apparatus of claim 1, further comprising logic configured to perform an active queue management (AQM) operation on only the second traffic class.

4. The user apparatus of claim 1, further comprising logic configured to perform a receive mitigation operation on only the second traffic class.

5. The user apparatus of claim 1, further comprising logic configured to enable a zero-copy data transfer on only the first traffic class.

6. The user apparatus of claim 1, further comprising time division duplex logic configured to transfer data via time slots; and
where the first resource comprises a first set of time slots and the second resource comprises a second set of time slots.

7. The user apparatus of claim 1, wherein the first traffic class comprises data packets generated by the user space low latency application, the data packets being directly written into a packet pool directly accessible by a port of the network interface.

8. One or more non-transitory, computer-readable media having instructions that, when executed, cause a computing device to:
allocate a first resource of the computing device for a first traffic class and a second resource of the computing device for a second traffic class, wherein the first traffic class is associated with a user space low latency application and the second traffic class is associated with non-low latency applications;
cause the user space low latency application to request low latency operations from a kernel space application via a low latency agent; and
transact the first traffic class via the first resource and the second traffic class via the second resource.

9. The one or more non-transitory, computer-readable media of claim 8, wherein the instructions, when executed, cause the computing device further to:
perform a copy-checksum operation on only the second traffic class.

10. The one or more non-transitory, computer-readable media of claim 8, wherein the instructions, when executed, cause the computing device further to:
perform an active queue management (AQM) operation on only the second traffic class.

11. The one or more non-transitory, computer-readable media of claim 8, wherein the instructions, when executed, cause the computing device further to:
perform a receive mitigation operation on only the second traffic class.

12. The one or more non-transitory, computer-readable media of claim 8, wherein the instructions, when executed, cause the computing device further to:
enable a zero-copy data transfer on only the first traffic class.

13. The one or more non-transitory, computer-readable media of claim 8, wherein the first resource comprises a first set of time slots and the second resource comprises a second set of time slots, and wherein the instructions, when executed, cause the computing device further to transfer data via time slots.

14. The one or more non-transitory, computer-readable media of claim 8, wherein the first traffic class comprises data packets generated by the user space low latency application, the data packets being directly written into a packet pool directly accessible by a port of a network interface of the computing device.

15. A method performed by a computing device, comprising:
allocating a first resource of the computing device for a first traffic class and a second resource of the computing device for a second traffic class, wherein the first traffic class is associated with a user space low latency application and the second traffic class is associated with non-low latency applications;
causing the user space low latency application to request low latency operations from a kernel space application via a low latency agent; and
transacting the first traffic class via the first resource and the second traffic class via the second resource.

16. The method of claim 15, further comprising:
performing a copy-checksum operation on only the second traffic class.

17. The method of claim 15, further comprising:
performing an active queue management (AQM) operation on only the second traffic class.

18. The method of claim 15, further comprising:
performing a receive mitigation operation on only the second traffic class.

19. The method of claim 15, wherein the transacting the first traffic class and the second traffic class comprises transacting the first traffic class via a first set of time slots and transacting the second traffic class via a second set of time slots.

20. The method of claim 15, wherein the first traffic class comprises data packets generated by the user space low latency application, the data packets being directly written into a packet pool directly accessible by a port of a network interface of the computing device.

* * * * *